US009736357B2

(12) United States Patent
Kudo

(10) Patent No.: US 9,736,357 B2
(45) Date of Patent: Aug. 15, 2017

(54) DISPLAY DEVICE THAT DETECTS MOVEMENT OF AN OPERATOR'S VISUAL LINE, DISPLAY METHOD AND COMPUTER READABLE STORAGE MEDIUM STORING DISPLAY PROGRAM OF DISPLAY DEVICE

(71) Applicant: OLYMPUS CORPORATION, Tokyo (JP)

(72) Inventor: Yasunori Kudo, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 4 days.

(21) Appl. No.: 14/470,430

(22) Filed: Aug. 27, 2014

(65) Prior Publication Data

US 2015/0062402 A1 Mar. 5, 2015

(30) Foreign Application Priority Data

Aug. 29, 2013 (JP) .................................. 2013-178686

(51) Int. Cl.
*H04N 5/232* (2006.01)
*G06F 3/01* (2006.01)

(52) U.S. Cl.
CPC ......... *H04N 5/23219* (2013.01); *G06F 3/013* (2013.01); *H04N 5/23245* (2013.01); *H04N 5/23293* (2013.01)

(58) Field of Classification Search
None
See application file for complete search history.

(56) References Cited

U.S. PATENT DOCUMENTS 5,977,976 A * 11/1999 Maeda .................... G06F 3/013
348/E5.047
6,538,697 B1 * 3/2003 Honda ............... H04N 5/23293
348/333.03
2004/0212695 A1 * 10/2004 Stavely .............. H04N 1/32128
348/231.3

(Continued)

FOREIGN PATENT DOCUMENTS

JP 05191683 A * 7/1993
JP 08-122887 5/1996
JP 2006295491 A * 10/2006

OTHER PUBLICATIONS

Office Action issued in corresponding Chinese Patent Appln. No. 201410438039.1 dated Apr. 1, 2017, consisting of 26 pp. (English Translation Provided).

*Primary Examiner* — Justin P Misleh
(74) *Attorney, Agent, or Firm* — Volpe and Koenig, P.C.

(57) ABSTRACT

A display device includes a display section, a visual line detecting section, a visual line judging section, a display control section, and a display changing section. The visual line judging section acquires a visual point position on the display screen corresponding to the visual line direction detected by the visual line detecting section, and judges whether or not the visual point position has entered into the a display region. The display changing section changes the display of at least one of a first display region and a second display region, if it is judged by the visual line judging section that the visual point position has entered into the second display region in the state where the visual point position is in the first display region.

23 Claims, 28 Drawing Sheets

(56) References Cited

U.S. PATENT DOCUMENTS

| | | | |
|---|---|---|---|
| 2004/0212712 A1* | 10/2004 | Stavely | A61B 3/113 348/333.03 |
| 2007/0192722 A1* | 8/2007 | Kokubo | G06F 1/1626 715/771 |
| 2011/0197156 A1* | 8/2011 | Strait | G06F 3/0481 715/771 |
| 2014/0247232 A1* | 9/2014 | George-Svahn | G06F 3/02 345/173 |

* cited by examiner

Set value display region

|  | X-coordinate start | X-coordinate end | Y-coordinate start | Y-coordinate end |
|---|---|---|---|---|
| Fno value setting region | Xa | Xb | Ya | Yb |
| SS value setting region | Xc | Xd | Ya | Yb |

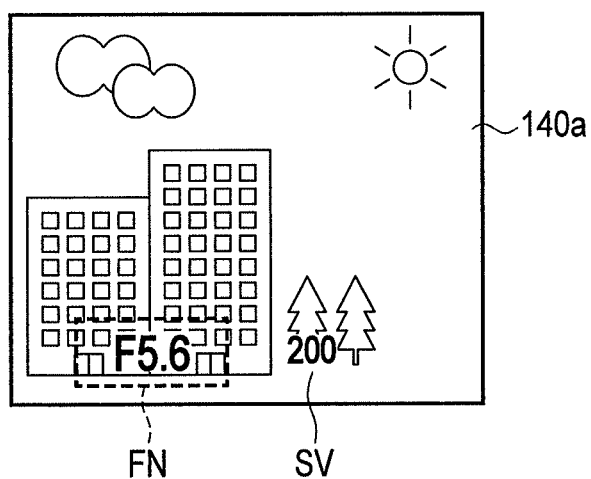
F I G. 8

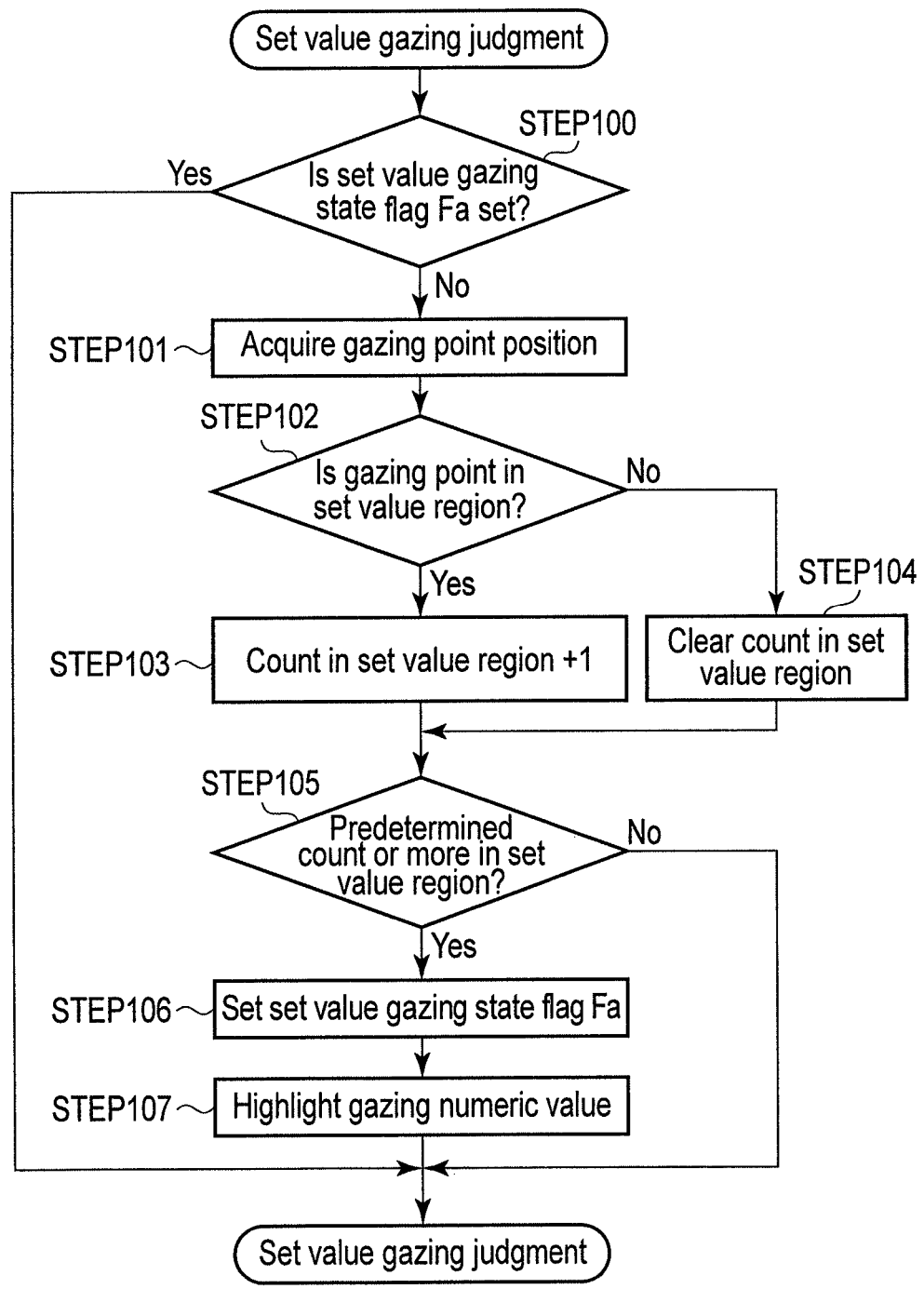
F I G. 10

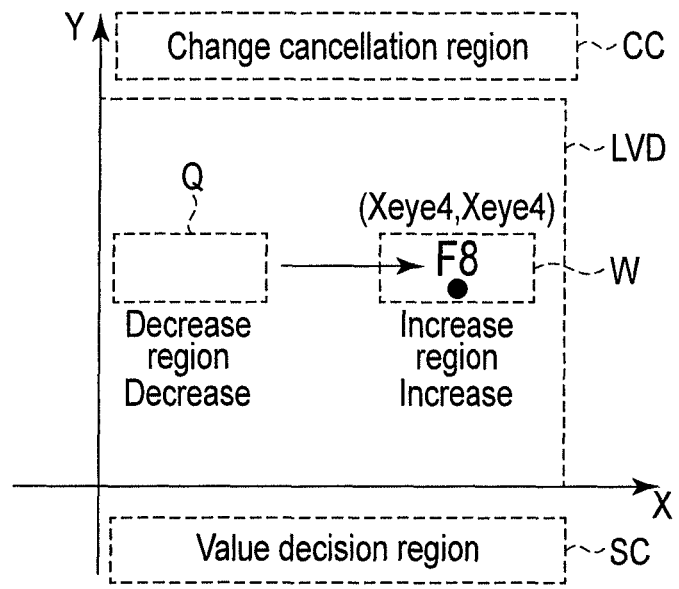
F I G. 15
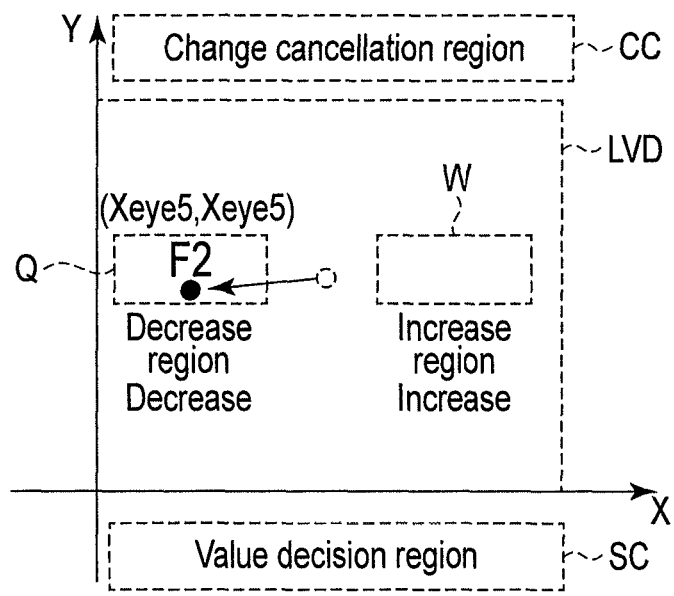
F I G. 16

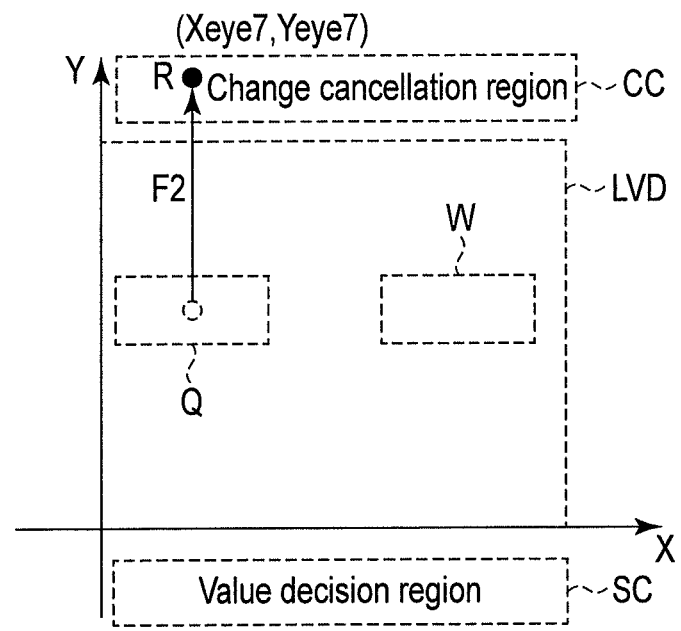
F I G. 19
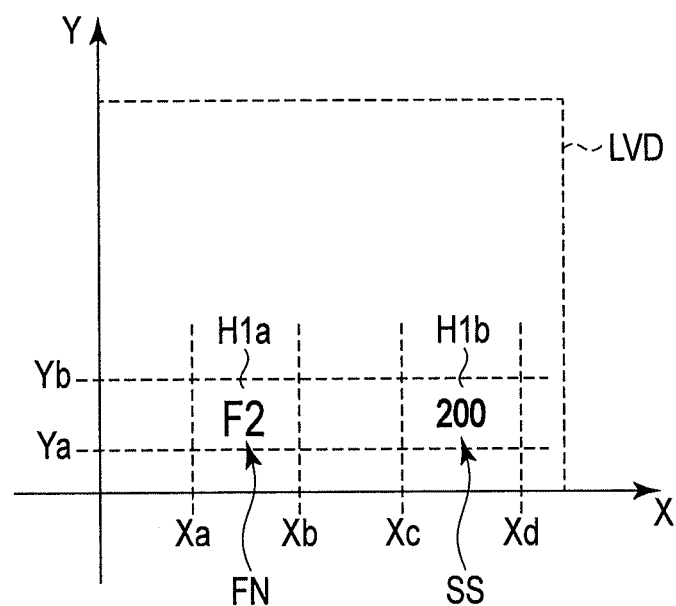
F I G. 20

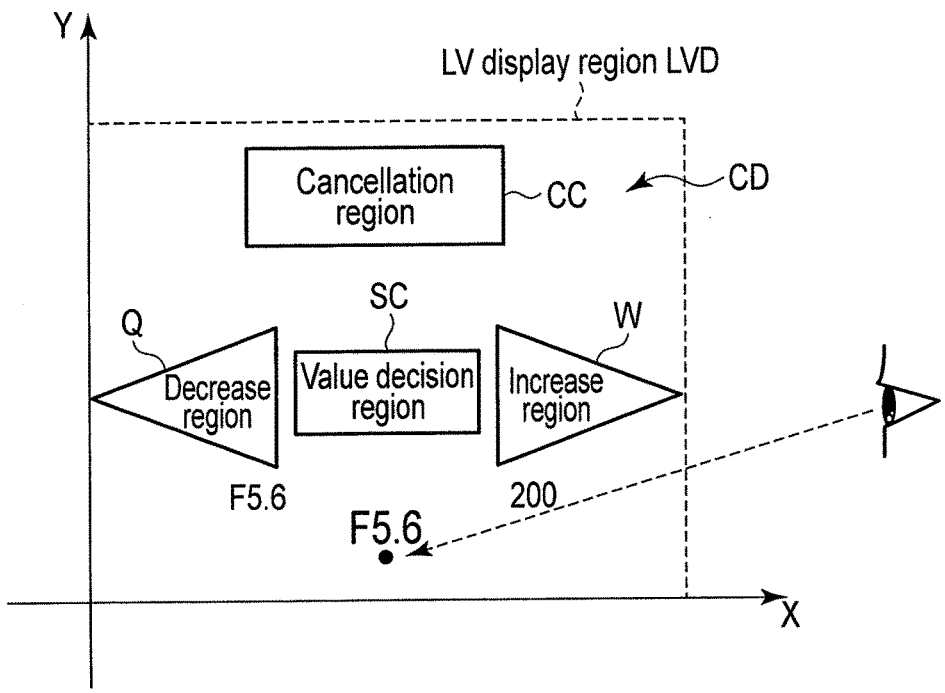
F I G. 21
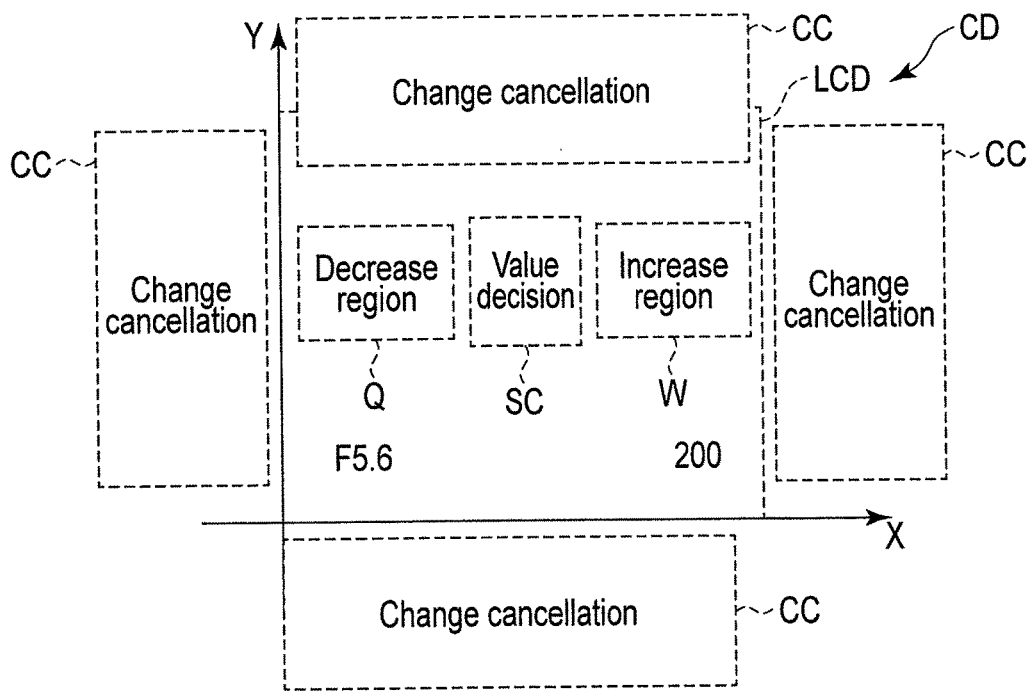
F I G. 22

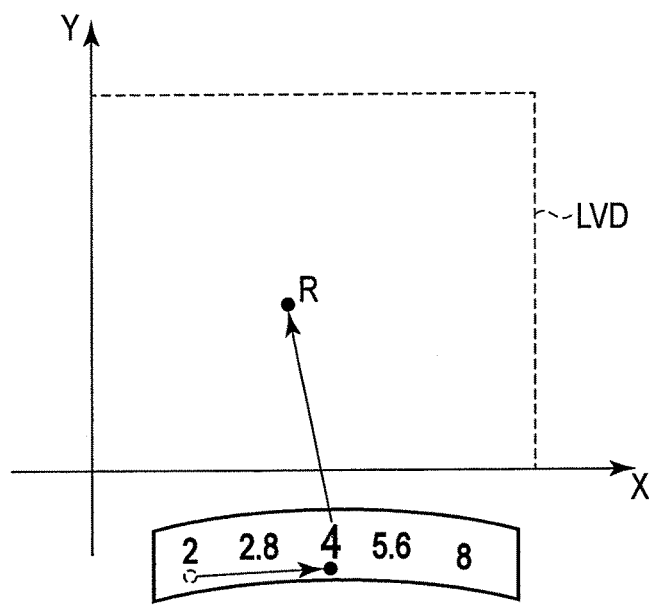
F I G. 30
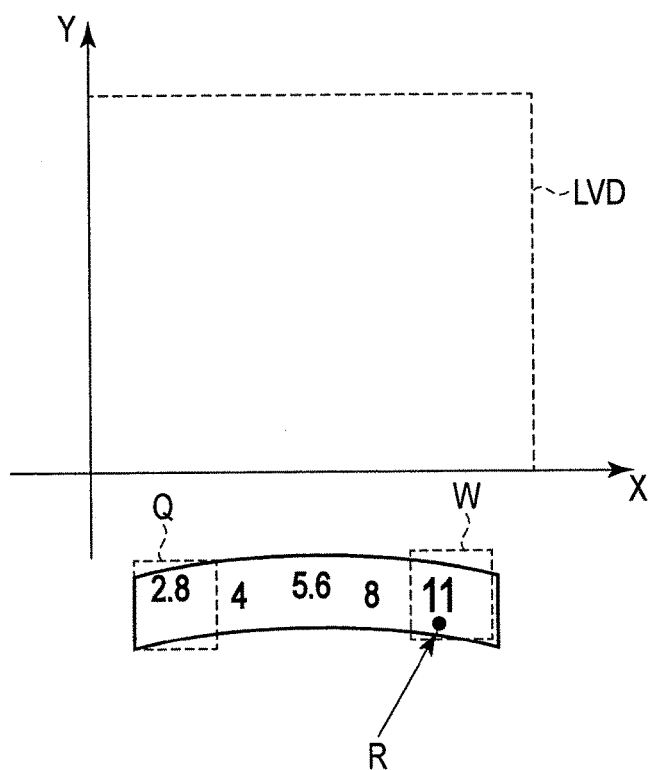
F I G. 31

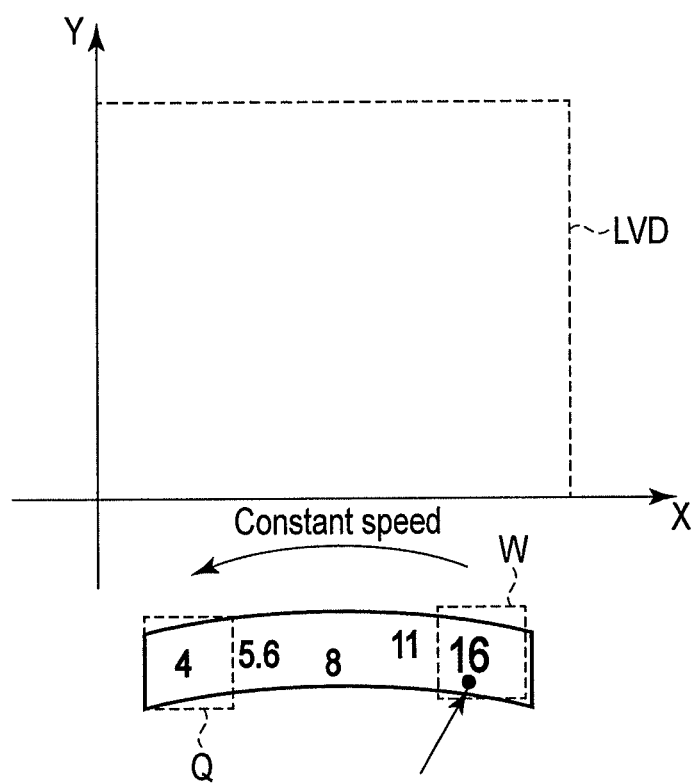
F I G. 32

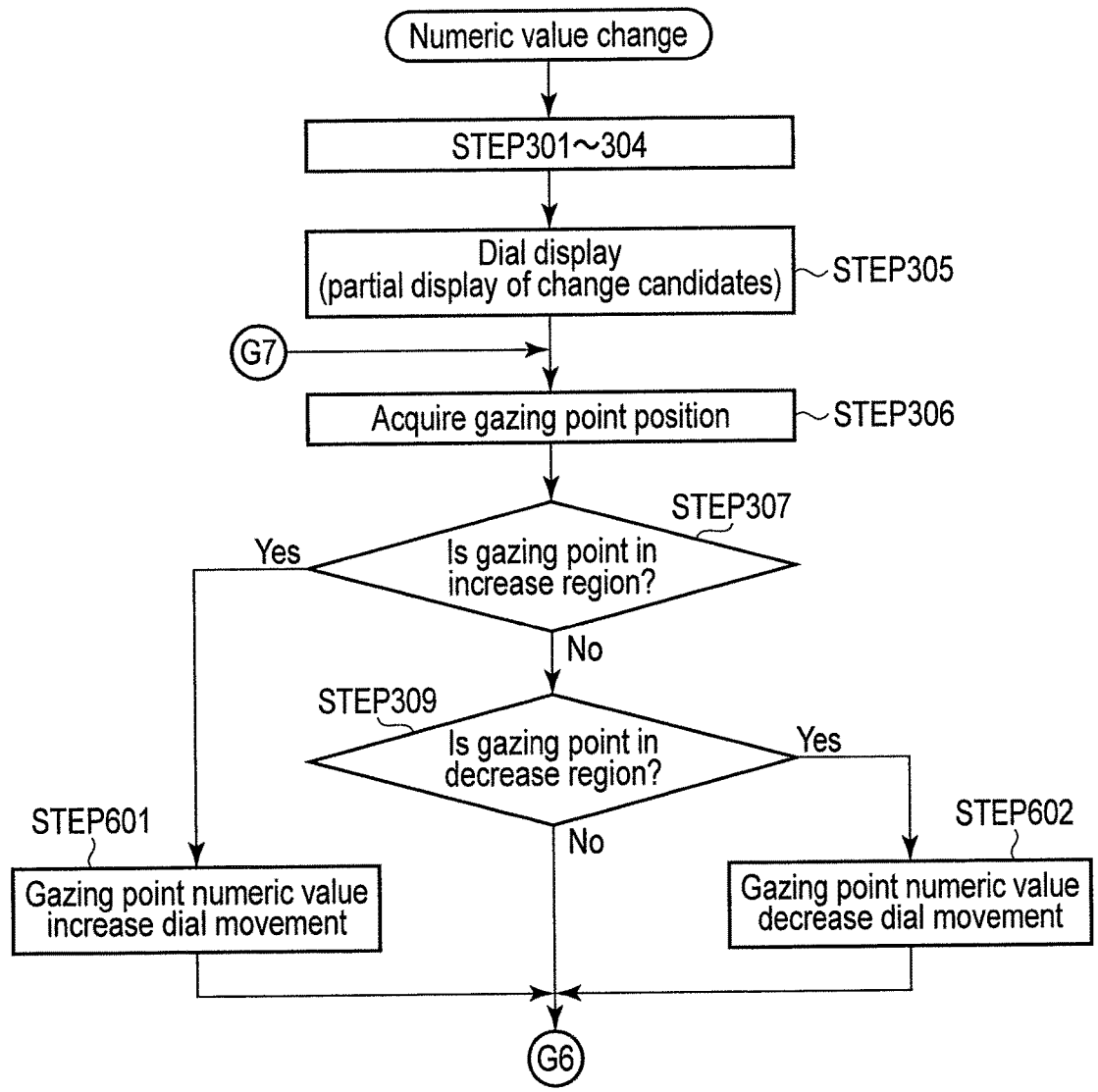
F I G. 33A

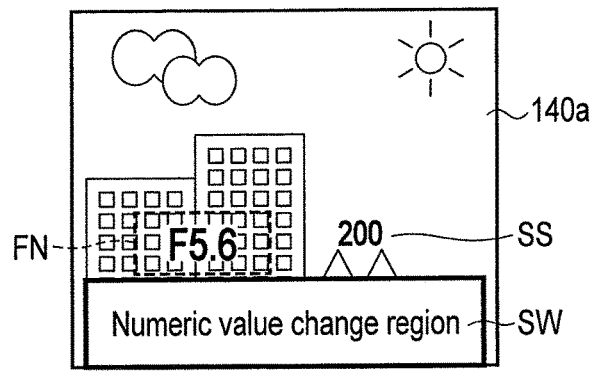
F I G. 34
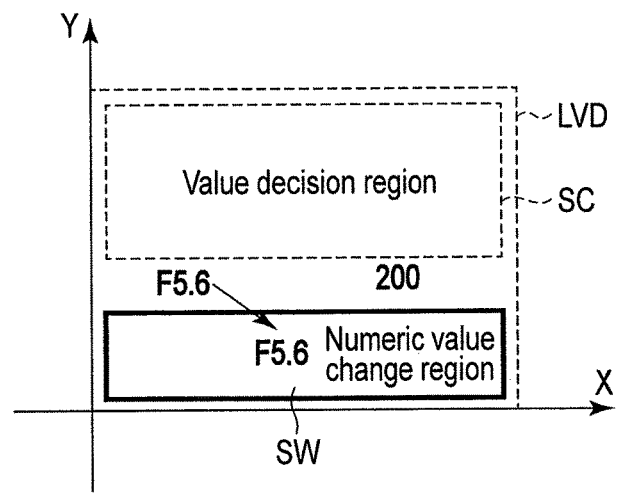
F I G. 35
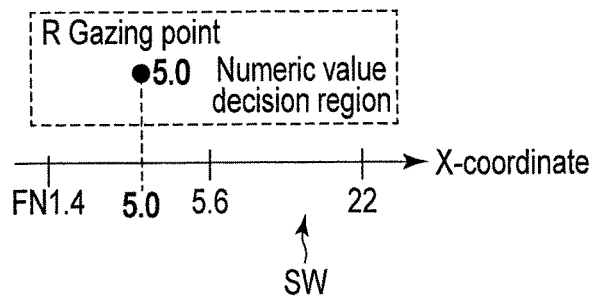
F I G. 36

DISPLAY DEVICE THAT DETECTS MOVEMENT OF AN OPERATOR'S VISUAL LINE, DISPLAY METHOD AND COMPUTER READABLE STORAGE MEDIUM STORING DISPLAY PROGRAM OF DISPLAY DEVICE

CROSS-REFERENCE TO RELATED APPLICATIONS

This application is based upon and claims the benefit of priority from the prior Japanese Patent Applications No. 2013-178686, Aug. 29, 2013 the entire contents of which are incorporated herein by reference.

BACKGROUND OF THE INVENTION

1. Field of the Invention

The present invention relates to a display device which detects movement of an operator's visual line on a display screen to change display of each parameter or the like, a display method, and a computer readable storage medium storing a display program of the display device.

2. Description of the Related Art

There are various products ranging from various industrial products and facilities to plants. Various parameters are set to the products, respectively. In general, each parameter is changed in accordance with a use situation, an operation or the like of each product. An example of a parameter changing method is a method which can be accomplished by detecting movement of an operator's visual line. An example of the product to which the method is applied is an imaging device disclosed in Jpn. Pat. Appln. KOKAI Publication No. H08-122887.

The publication discloses a camera which is operable by inputting a visual line. The publication discloses that display of the present setting state concerning a photographing operation of the camera and display for change of the setting state are performed in a finder and that when a photographer's visual line position is detected, the setting state concerning the photographing operation of the camera which is displayed in the finder is changed in accordance with the photographer's visual line position.

BRIEF SUMMARY OF THE INVENTION

A display device according to an aspect of the present invention comprises; a display section which includes a display screen and in which a first display region and a second display region are displayed in the display screen; a visual line detecting section which detects a visual line direction of an operator; a visual line judging section which acquires a visual point position on the display screen corresponding to the visual line direction detected by the visual line detecting section, and judges whether or not the visual point position has entered into the first display region; a display control section which holds a state where the visual point position is in the first display region, if the visual line judging section judges that the visual point position has entered into the first display region; and a display changing section which changes the display of at least one of the first display region and the second display region, if it is judged by the visual line judging section that the visual point position has entered into the second display region in the state where the visual point position is in the first display region.

A display method according to an aspect of the present invention comprises; displaying a first display region and a second display region in a display section including a display screen; detecting a visual line direction of an operator; acquiring a visual point position on the display screen corresponding to the visual line direction; judging whether or not the visual point position has entered into the first display region; holding a state where the visual point position is in the first display region, if it is judged that the visual point position has entered into the first display region; and changing the display of at least one of the first display region and the second display region, if it is judged that the visual point position has entered into the second display region in the state where the visual point position is in the first display region.

A non-transitory computer readable storage medium storing a display program of a display device, the program comprises: a display function of displaying a first display region and a second display region in a display screen of a display section; a visual line detecting function of detecting a visual line direction of an operator; a visual line judging function of acquiring a visual point position on the display screen corresponding to the visual line direction detected by the visual line detecting function and judging whether or not the visual point position has entered into the first display region; a display control function of holding a state where the visual point position is in the first display region, when it is judged by the visual line judging function that the visual point position has entered into the first display region; and a display changing function of changing the display of at least one of the first display region and the second display region, if it is judged by the visual line judging function that the visual point position has entered into the second display region in the state where the visual point position is in the first display region.

Additional advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a view showing one example of highlighting of the parameter in the camera;

FIG. 10 is a parameter gazing judgment flowchart in the camera;

FIG. 15 is a view showing judgment of whether or not the operator's gazing point is present in an increase region by the parameter changing section in the camera;

FIG. 16 is a view showing judgment of whether or not the operator's gazing point is present in a decrease region by the parameter changing section of the camera;

FIG. 19 is a view showing that the operator's gazing point has moved into a value decision region in the camera;

FIG. 20 is a view showing a numeric value of the changed parameter (the F number) in the camera;

FIG. 21 is a schematic view showing a change display region displayed by a digital single lens reflex camera to which a second embodiment of the parameter changing device according to the present invention is applied;

FIG. 22 is a view showing a modification of the change display region in the camera;

FIG. 30 is a view showing changed setting of the parameter decreased by the parameter changing section in the camera;

FIG. 31 is a view showing highlighting in an increase region by the parameter changing section in the camera;

FIG. 32 is a view showing changed setting of the parameter increased by the parameter changing section in the camera;

FIG. 33A is a numeric value changing flowchart in the camera;

FIG. 34 is a view showing a numeric value change region displayed by a digital single lens reflex camera to which a fifth embodiment of the parameter changing device according to the present invention is applied;

FIG. 35 is a view showing a value decision region displayed by the camera;

FIG. 36 is a view showing one example of the numeric values of the parameter on an X-axis in the numeric value change region displayed by the camera;

DETAILED DESCRIPTION OF THE INVENTION

First Embodiment

Hereinafter, a first embodiment of the present invention will be described with reference to the drawings.

Figure 1:
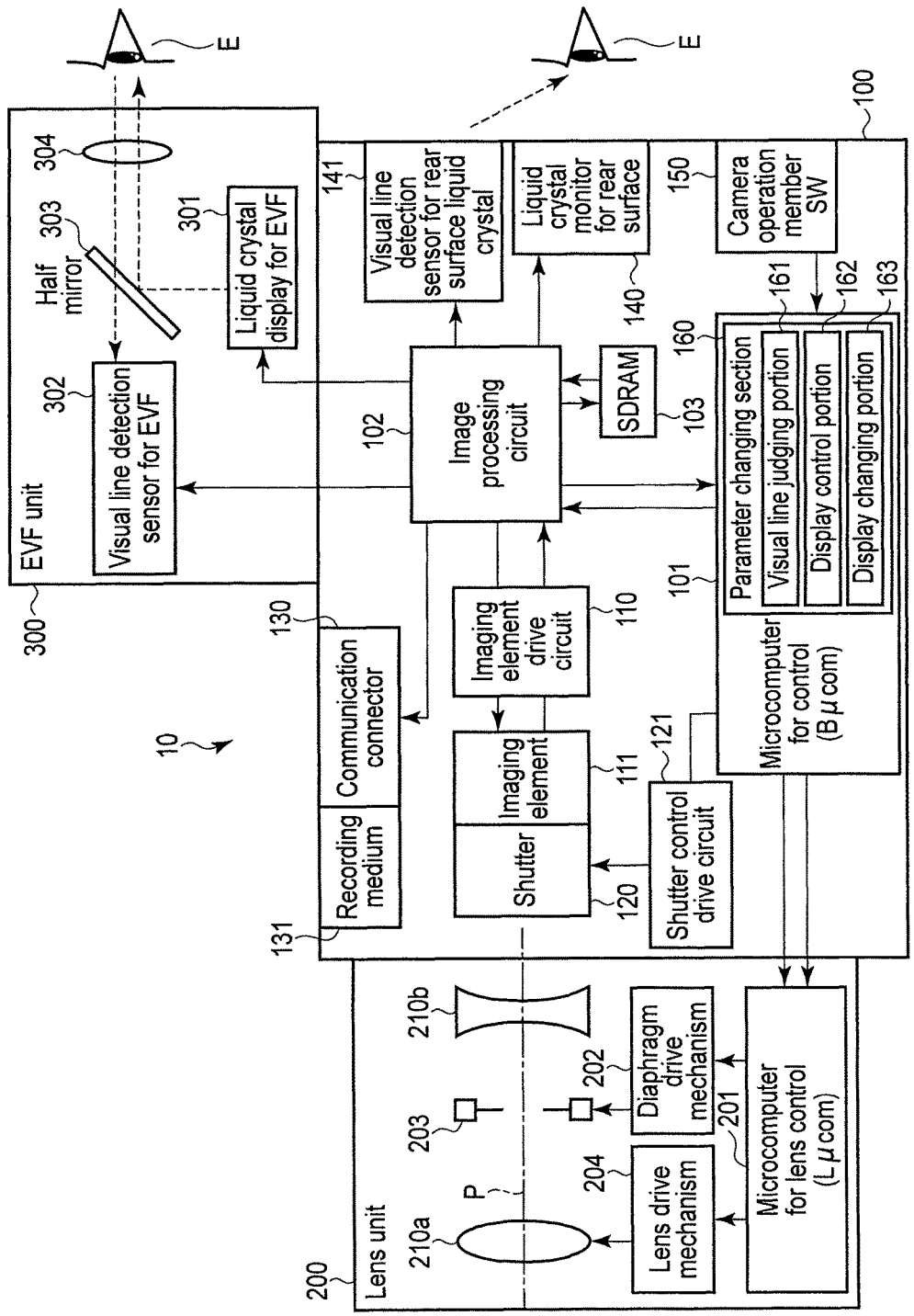
FIG. 1 is a constitutional view showing a digital single lens reflex camera as a photographing device to which a first embodiment of a parameter changing device according to the present invention is applied.

FIG. 1 shows a constitutional view of digital single lens reflex camera (hereinafter, referred to as a camera) 10 as an imaging device. The camera 10 includes a body unit 100, a lens unit (a lens barrel) 200, an eyepiece type electronic view finder (EVF unit) 300, and a recording medium 131 as a storage medium. The lens unit 200 is replaceable to, for example, the body unit 100. The EVF unit 300 performs, for example, live view display. The recording medium 131 records obtained image data. The recording medium 131 is connected to the body unit 100 via, for example, a communication connector 130.

The lens unit 200 is disposed on a front surface of the body unit 100, and is detachably attached to the body unit 100 via a lens mount. The lens unit 200 is replaceable in the camera 10.

The lens unit 200 includes respective photographing lenses 210a, 210b, a diaphragm 203, a lens drive mechanism 204, and a diaphragm drive mechanism 202. The lens drive mechanism 204 includes a DC motor therein. The diaphragm drive mechanism 202 includes a stepping motor therein. The photographing lenses 210a, 210b are driven in a direction of an optical axis p by driving the DC motor in the lens drive mechanism 204. The diaphragm 203 is driven in a stepping manner by the stepping motor in the diaphragm drive mechanism 202. The driving of each of the photographing lenses 210a, 210b and the diaphragm 203 is controlled by a microcomputer 101 for body control on the side of the body unit 100.

The lens unit 200 includes a microcomputer (hereinafter, referred to as "Lμcom") 201 for lens control. The Lμcom 201 receives various data from the microcomputer 101 for body control to drive and control the lens drive mechanism 204 and the diaphragm drive mechanism 202.

The body unit 100 includes a focal plane type shutter unit 120 and an imaging element 111. The shutter unit 120 includes a front curtain and a rear curtain. In the shutter unit 120, a shutter opening/closing operation is performed by a shutter control drive circuit 121. The imaging element 111 photoelectrically converts a subject image passed through the respective photographing lenses 210a, 210b. The shutter unit 120 and the imaging element 111 are disposed on the optical axis p. For the imaging element 111, the photoelectric conversion is controlled by an imaging element drive circuit 110. The imaging element drive circuit 110 comprises an integrated circuit (IC).

A luminous flux from a subject passes from the respective photographing lenses 210a, 210b through the shutter unit 120, to form an image by the imaging element 111. For the imaging element 111, the photoelectric conversion is controlled by the imaging element drive circuit 110. The imaging element 111 photoelectrically converts the subject image formed by the respective photographing lenses 210a, 210b into an analog electric signal. The analog electric signal output from the imaging element 111 is sent to an image processing circuit 102.

The image processing circuit 102 converts the analog electric signal from the imaging element 111 into a digital electric signal, and converts the signal into the image data by each type of image processing.

The image processing circuit 102 subjects the digital electric signal from the imaging element 111 to each type of image processing, for example, color correction processing, gamma ($\gamma$) correction processing, compression processing, and expansion processing to the compressed image data.

The image processing circuit 102 converts the image data obtained by each type of image processing into, for example, JPEG data, and stores the image data in the recording medium 131 via the communication connector 130. The image processing circuit 102 converts the image data obtained by each type of image processing into a video signal so that a live view is displayed in the EVF unit 300. The image processing circuit 102 includes a face detection engine to provide face detection processing. The image processing circuit 102 comprises an integrated circuit (IC). The image processing circuit 102 is connected to an SDRAM (Synchronous Dynamic Random Access Memory) 103 which is a memory for temporary storage. The SDRAM 103 is used as a storage region to temporarily store the image data obtained by the image processing circuit 102.

The image processing circuit 102 is connected to the communication connector 130, a liquid crystal monitor (display section) 140 for a rear surface, a visual line detection sensor for rear surface liquid crystal (a visual line detecting section) 141, and a liquid crystal display 301 for EVF and a visual line detection sensor 302 for EVF of the EVF unit 300.

The body unit 100 includes the microcomputer (Bµcom) 101 for body control. The Bµcom 101 is connected to the image processing circuit 102, the shutter control drive circuit 121, a camera operation switch (SW) 150, and the lens drive mechanism 204 and the diaphragm drive mechanism 202 of the lens unit 200. The Bµcom 101 receives an operation instruction from the camera operation switch (SW) 150, to control the image processing circuit 102, the shutter control drive circuit 121, and the lens drive mechanism 204 and the diaphragm drive mechanism 202 of the lens unit 200 in accordance with the operation instruction.

The recording medium 131 is an external recording medium such as each type of semiconductor memory card or an external hard disk drive (HDD). The recording medium 131 is capable of communicating with the body unit 100 via the communication connector 130. The recording medium 131 is replaceably attached to the body unit 100.

The Bµcom 101 includes a counting function, a mode setting function, a detecting function, a judging function, a computing function and the like in addition to a control function of controlling the whole operation of the camera 10. The Bµcom 101 includes a timer to measure a photographing interval during continuous photographing. The Bµcom 101 is connected to the communication connector 130, the shutter drive control circuit 121, the liquid crystal monitor 140, the camera operation switch (SW) 150, and a power supply. The liquid crystal monitor 140 performs display to notify a photographer of an operation state of the camera by a display output.

The Bµcom 101 is electrically connected to the Lµcom 201 so that the microcomputers are capable of communicating with each other via the communication connector 130, when the lens unit 200 is attached to the body unit 100. The Lµcom 201 subordinately cooperates with the Bµcom 101 to operate as a digital camera.

The shutter drive control circuit 121 controls the movement of the front curtain and the rear curtain in the shutter unit 120. The shutter drive control circuit 121 transmits a signal to control an opening/closing operation of the shutter and a signal at the end of running of the front curtain to the Bµcom 101.

The liquid crystal monitor 140 for the rear surface notifies an operator (the photographer) of the operation state of the camera by the display output.

The visual line detection sensor 141 for the rear surface liquid crystal detects a visual line direction of the operator. The visual line detection sensor 141 for the rear surface liquid crystal photographs an image of a face part of the operator, and judges the visual line direction on the basis of one or both of the presence/absence of at least a nostril part of the face part of the operator in the image obtained by the photographing and a position of a pupil of an eye part E. The visual line detection sensor 141 for the rear surface liquid crystal is not limited to the detection of the visual line direction of the operator and also performs the detection of the visual line position of the operator.

In the judgment of the visual line direction by the pupil position, for example, a reference eye line direction is set, and the pupil position of the eye part E, i.e., the position of an iris in the reference eye line direction is preset. In the judgment of the visual line direction, for example, the iris position of the reference eye line direction is compared with the iris position detected by the visual line detection sensor 141 for the rear surface liquid crystal (the detected iris position), and it is judged whether the detected iris position is on a left side, a right side, or a front side to the iris position of the reference eye line direction. Then, it is judged from this judgment result whether the visual line direction is a left direction, a right direction, or a front direction.

In the judgment of the visual line direction, for example, a region of the white of the eye and a region of the iris of the eye at the iris position of the reference eye line direction are preset, the respective preset regions are compared with the region of the white of the eye and the region of the iris of the eye at the iris position detected by the visual line detection sensor 141 for the rear surface liquid crystal, and it is judged from the result of the comparison whether the visual line direction is the left direction, the right direction, or the front direction. For example, if the left part of the eye part E has a larger region of the iris of the eye, it is judged that the visual line direction is the left direction.

In the judgment of the visual line direction, the direction may be set on the basis of a pattern of a nose ridge, nostrils, or a contour pattern of the face part, and may be judged on the basis of a change of the position of the iris of the eye (or the position of the white of the eye). In the judgment of the visual line direction, reference positions of the white of the eye and the iris of the eye may be determined, and it may be judged from a difference in position between the white of the eye and the iris of the eye to the reference positions whether the visual line is on the left side, the right side or the front side.

The camera operation switch 150 is a switch group including operation buttons required for the operator to operate the camera, for example, a release switch, a mode change switch, a power switch and the like. The release switch is a switch to instruct execution of a photographing operation. The mode change switch is a switch to change a photographing mode to a continuous photographing mode, usual photographing mode or the like. The power switch is a switch to switch ON/OFF of the power supply.

In the body unit 100, a power supply such as a battery and a power supply circuit are disposed. The power supply circuit converts an output of the power supply into a voltage required for each circuit unit of the camera 10 to supply the power.

In the Bµcom 101, the EVF unit 300 is disposed. The EVF unit 300 performs the live view display. The EVF unit 300 includes a liquid crystal display 301 for EVF. The liquid crystal display 301 for EVF inputs an image signal subjected to image processing by the image processing circuit 102 to perform the live view display.

The visual line detection sensor 302 for EVF detects, for example, whether or not the operator looks into the live view displayed in the EVF unit 300. The visual line detection sensor 302 for EVF detects the visual line direction of the operator when the operator looks into the EVF unit 300. The visual line detection sensor 302 for EVF detects the eye part of the operator via a half mirror 303 and an eyepiece lens 304. A live view image displayed in the liquid crystal display 301 for EVF is reflected by the half mirror 303 to reach the eye part of the operator.

The Bµcom 101 beforehand stores a parameter change program in a program memory. The Bµcom 101 executes the parameter change program to realize, for example, a display function of displaying a parameter such as an F number or a shutter speed on a display screen of the liquid crystal monitor 140 for the rear surface which is a display section; a visual line detecting function of inputting a visual line detection signal output from the visual line detection sensor 141 for the rear surface liquid crystal to detect the visual line direction of the operator; and a changing function of acquiring a visual point position (hereinafter referred to as a gazing point) on the display screen of the liquid crystal monitor 140 for the rear surface which corresponds to the visual line direction detected by this visual line detecting function, and continuously disposing a display position of a parameter such as the F number or the shutter speed in accordance with the gazing point to change the parameter, i.e., maintaining a dragged state where the parameter is moved to follow the movement of the gazing point of the operator, and changing the parameter in conjunction with the dragged gazing point.

The dragging indicates that when the gazing point of the operator moves to a state where the gazing point of the operator is present on the display screen of the liquid crystal monitor 140 for the rear surface and the gazing point of the operator is present on a region including the parameter, the parameter moves following the movement of the gazing point of the operator. The movement is internally processed by a display control portion 162 in the Bµcom 101. A movement position of the parameter moves on the same coordinate as in the gazing point of the operator on the display screen of the liquid crystal monitor 140 for the rear surface.

The changing function of the parameter realizes, for example, a display function of displaying a first display region including the parameter and a second display region to enable the change of the parameter on the display screen of the liquid crystal monitor for the rear surface, and a function of judging whether or not the gazing point moves from the first display region into the second display region. If the gazing point is in the second display region, a change display region to change the parameter is displayed to change the parameter by the movement of the gazing point in the change display region.

The judgment of whether or not the gazing point is in the second display region is performed by a visual line judging portion 161 in a parameter changing section 160. The change of the parameter is performed by the display control portion 162 in the parameter changing section 160.

The change display region includes at least an increase region to increase the parameter, a decrease region to decrease the parameter, and a decision region to decide the change of the parameter.

In the changing function, if the gazing point enters into the second display region, the parameter is maintained in a changeable state. In the changing function, if the gazing point is dragged and moved into the increase region, the parameter is increased. In the changing function, if the gazing point is dragged and moved into the decrease region, the parameter is decreased. In the changing function, if the gazing point is dragged and moved into the decision region, the parameter is decided.

The Bµcom 101 includes the parameter changing section 160 to realize the parameter changing function.

The parameter changing section 160 acquires the visual line direction of the operator from, for example, the visual line detection sensor 141 for the rear surface liquid crystal, through the image processing circuit 102, and converts the movement of the gazing point corresponding to the visual line direction of the operator, on the display screen of the liquid crystal monitor 140 for the rear surface. The parameter changing section 160 judges whether or not the gazing point on the display screen of the liquid crystal monitor 140 for the rear surface is continuously present from the region including a parameter such as the F number or the shutter speed onto the region to change the parameter. If the parameter changing section 160 judges that the gazing point is continuously present on the region to change the parameter, the section changes a parameter such as the F number or the shutter speed.

If the parameter changing section 160 maintains the gazing point of the operator in the dragged state on the display screen of the liquid crystal monitor 140 for the rear surface, and drags and moves the gazing point of the operator from the region including a parameter such as the F number or the shutter speed onto the region to change the parameter, the parameter is changed.

As described above, the parameter changing section 160 includes the visual line judging portion 161, the display control portion 162, and a display changing portion 163. The visual line judging portion 161 acquires the gazing point of the operator on the display screen of the liquid crystal monitor 140 for the rear surface corresponding to the visual line direction of the operator detected by the visual line detection sensor 141 for the rear surface liquid crystal and the visual line position of the operator, and the portion judges whether or not the gazing point has entered into the first display region.

The display control portion 162 holds a state where the gazing point is in the first display region, when it is judged by the visual line judging portion 161 that the gazing point of the operator has entered into the first display region. That is, the display control portion 162 maintains the gazing point of the operator in the dragged state.

The display control portion 162 moves the display position of the first display region in conjunction with the movement of the visual line position, if it is judged by the visual line judging portion 161 that the visual line position of the operator has entered into the first display region. For example, the display control portion 162 moves the gazing point of the operator in the dragged state in conjunction with the movement of the visual line position.

The display changing portion 163 changes the display of at least one of the first display region and the second display region, if it is judged by the visual line judging portion 161 that the gazing point of the operator has entered into the second display region in a state where the gazing point of the operator is in the first display region.

Figure 2:
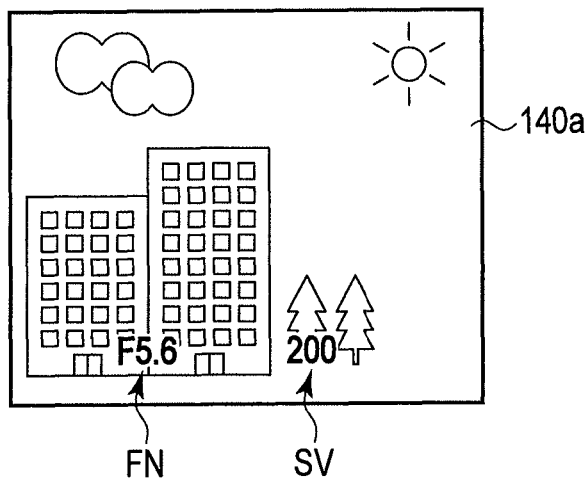
FIG. 2 is a view showing an F number and a shutter speed as parameters displayed on a display screen of a liquid crystal monitor for a rear surface in the camera.

FIG. 2 shows parameters such as an F number FN (F5.6) and a shutter speed SS (200) displayed together with a subject such as a landscape on a display screen 140a of the liquid crystal monitor 140 for the rear surface. The parameter changing section 160 detects the movement of the gazing point of the operator to change the F number FN (F5.6), the shutter speed SS (200) or the like. Examples of the parameter specifically include the F number FN (F5.6) and the shutter speed SS (200), but the present invention is not limited to these examples, and can be applied to the change of each type of parameter.

The parameter changing section 160 converts respective positions of the gazing point of the operator, the F number FN, the shutter speed SS and the like on the display screen 140a of the liquid crystal monitor 140 for the rear surface onto, for example, an XY-coordinate.

Figure 3:
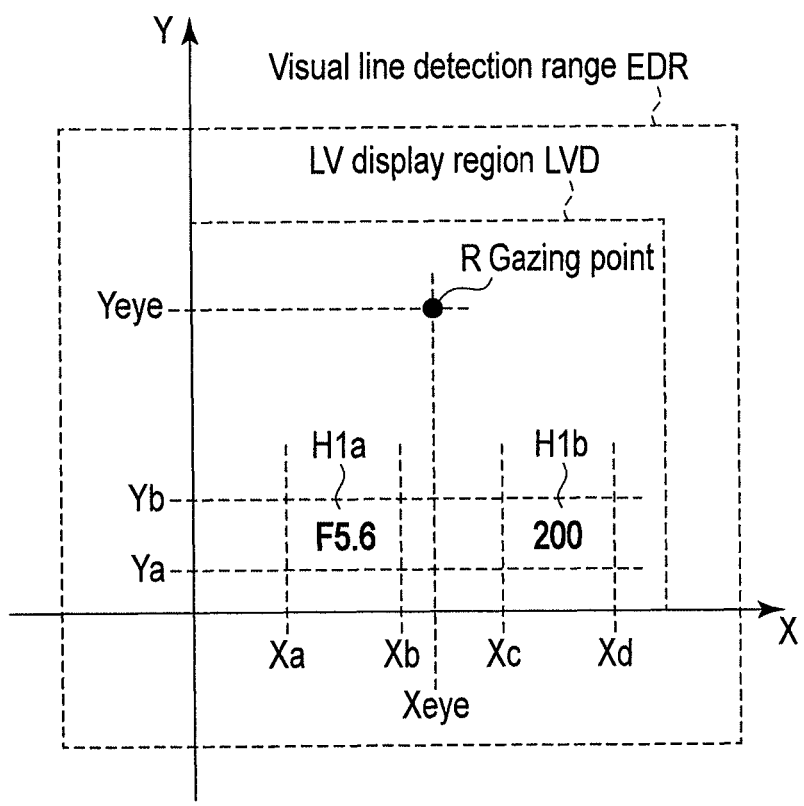
FIG. 3 is a schematic view showing a coordinate of visual line detection by an XY-coordinate converted by the camera.

FIG. 3 shows a schematic view of a coordinate of visual line detection by the XY-coordinate. On the visual line detection coordinate, there are formed first display regions H1a, H1b including, for example, the F number FN and the shutter speed SS as the parameters. In the first display region H1a, the F number FN is displayed. In the first display region H1b, the shutter speed SS is displayed.

Figures 4, 5:
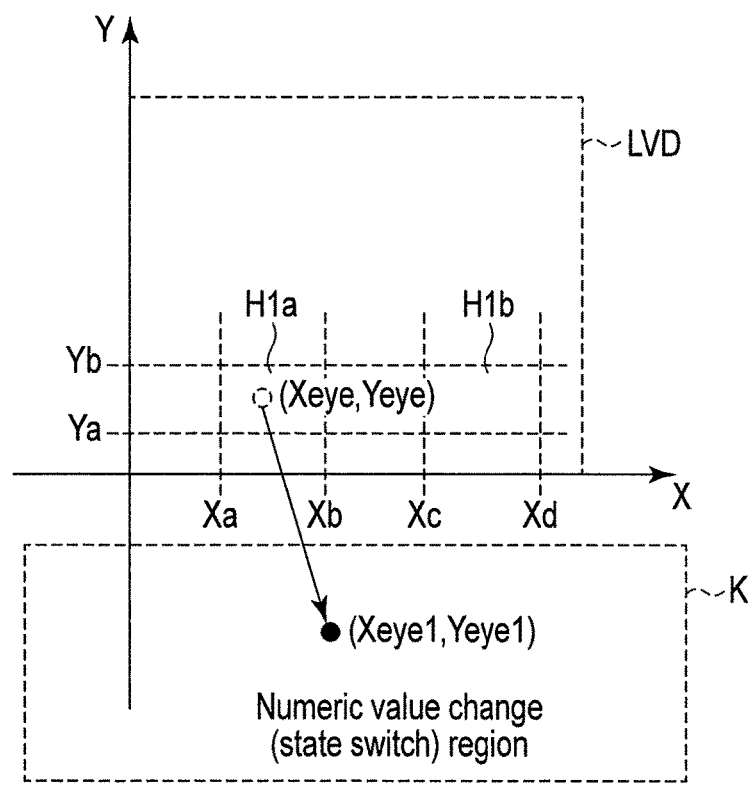
FIG. 4 is a diagram showing display regions (setting value display regions) of the F number and the shutter speed as the parameters in the camera.
FIG. 5 is a schematic view showing a numeric value change region as a second display region in the camera.

The first display regions H1a, H1b include display regions (set value display regions) shown by such coordinates as shown in FIG. 4. The first display region H1a is a region to display F number FN (an Fno value setting region). In the first display region H1a, the start of the X-coordinate is Xa, the end thereof is Xb, the start of the Y-coordinate is Ya, and the end thereof is Yb. The first display region H1b is a region to display the shutter speed SS (an SS value setting region). In the first display region H1b, the start of the X-coordinate is Xc, the end thereof is Xd, the start of the Y-coordinate is Ya, and the end thereof is Yb.

On the visual line detection coordinate, there is displayed a gazing point R of the operator on the display screen 140a of the liquid crystal monitor 140 for the rear surface on the basis of the visual line direction detected by the visual line detection sensor 141 for the rear surface liquid crystal. The gazing point R is represented by X-coordinate Xeye and Y-coordinate Yeye.

On the visual line detection coordinate, a live view display region LVD and a visual line detection range EDR are formed. The visual line detection range EDR is a range in which the visual line direction of the operator is detectable by the visual line detection sensor 141 for the rear surface liquid crystal.

On the visual line detection coordinate, a numeric value change region (a state switch region) K is formed as the second display region to allow the change of the parameter as shown in FIG. 5.

The parameter changing section 160 displays the first display regions H1a, H1b and the numeric value change region K on the display screen 140a of the liquid crystal monitor 140 for the rear surface.

The parameter changing section 160 judges whether or not the dragged and moved gazing point R of the operator is present in the first display region H1a, H1b including, for example, the F number FN or the shutter speed SS as the parameter.

As a result of the judgment, if the gazing point R of the operator is in the first display region H1a, H1b, the parameter changing section 160 judges whether or not the dragged and moved gazing point R of the operator is present in the numeric value change region K to change the F number FN, the shutter speed SS or the like.

Figure 7:
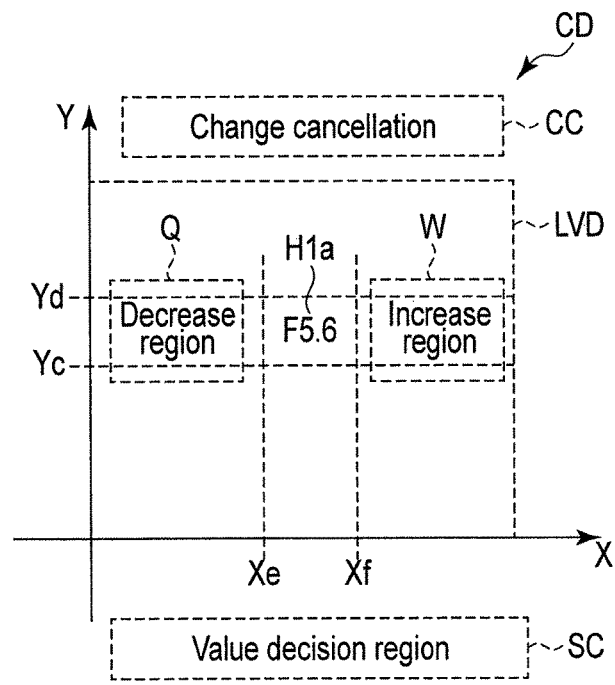
FIG. 7 is a schematic view showing a change display region in the camera.

As a result of the judgment, if the gazing point R of the operator is in the numeric value change region K, the parameter changing section 160 displays such a change display region (a third display region) CD as shown in FIG. 7 to change a parameter such as the F number FN or the shutter speed SS in a state where the drag movement is maintained.

Figure 6:
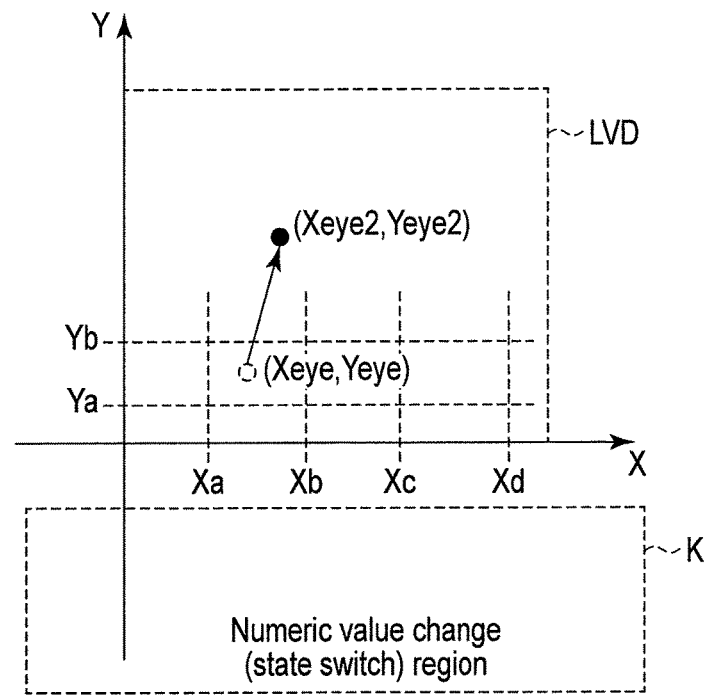
FIG. 6 is a schematic view showing one example of cancellation of display of the numeric value change region in the camera.

The parameter changing section 160 displays the change display region CD shown in FIG. 7, if the gazing point R of the operator is in the numeric value change region K. On the other hand, if the gazing point R of the operator is not dragged and moved into the numeric value change region K but is dragged and moved in the live view display region LVD as shown in, for example, FIG. 6, the parameter changing section 160 cancels the change of a parameter such as the F number FN or the shutter speed SS.

The change display region CD includes at least an increase region W and a decrease region Q to increase and decrease a parameter such as the F number FN or the shutter speed SS. Specifically, for example, if the F number FN is changed, the increase region W and the decrease region Q are displayed on right and left sides (an X-axis direction) of the first display region H1a to display the F number FN, in the change display region CD. Furthermore, in the change display region CD, a value decision region SC and a change cancellation region CC are displayed on a vertical side (a Y-axis direction) of the first display region H1a. An arrangement direction (the X-axis direction) of the increase region W and the decrease region Q and an arrangement direction (the Y-axis direction) of the value decision region SC and the change cancellation region CC are in a relation of a mutually vertical direction.

For the increase region W, if the gazing point R is present in the increase region W, for example, the F number FN is increased as the parameter. For the decrease region Q, if the gazing point R is present in the decrease region Q, for example, the F number FN is decreased. In the value decision region SC, for example, the change of the F number FN is decided. In the change cancellation region CC, for example, the change of the F number FN is cancelled. The change cancellation region CC is not necessarily displayed on the display screen 140a of the liquid crystal monitor 140 for the rear surface, and may separately be disposed as, for example, a mechanical button.

In the increase region W and the decrease region Q, change amounts to be increased and decreased can variably be set, respectively.

The parameter changing section 160, following the movement of the gazing point R of the operator, drags and moves a parameter such as the F number FN or the shutter speed SS from the inside of the first display region H1a into the numeric value change region K.

If the gazing point R of the operator drags and moves from the inside of the first display region H1a into the numeric value change region K, the parameter changing section 160 operates as follows. On the visual line detection coordinate shown in FIG. 3, if the operator gazes into the first display region H1a or H1b and the gazing point R of the operator is dragged and moved into the numeric value change region K, the parameter changing section 160 judges whether or not the gazing point R of the operator is present in the numeric value change region K for a predetermined time or more.

As a result of the judgment, if the gazing point R of the operator is present in the numeric value change region K for the predetermined time or more, the parameter changing section 160 changes a display mode of each parameter in the first display region H1a or H1b, for example, the F number FN or the shutter speed SS, and shifts to the change of the parameter. For the change of the display mode, as shown in, for example, FIG. 8, the parameter is highlighted. In the highlighting of the parameter, a numeric value of the F number FN (F5.6) is displayed in bold characters and a font size is enlarged. The change of the display mode of the parameter is not limited to the highlighting, but a display color may be changed, or the display mode may be changed to blinking or the like.

The change display region CD includes at least regions to increase and decrease a parameter such as the F number FN or the shutter speed SS, i.e., the increase region W and the decrease region Q.

The parameter changing section 160 increases or decreases a parameter such as the F number FN or the shutter speed SS, if the gazing point continues to be present in the increase region W or the decrease region Q for the predetermined time.

The parameter changing section 160 maintains the parameter in a changeable state, if the gazing point R of the operator drags and moves into the numeric value change region K. In this state, the parameter changing section 160 increases the parameter, if the gazing point R of the operator drags and moves into the increase region W. The parameter changing section 160 decreases the parameter, if the gazing point R of the operator drags and moves into the decrease region Q. The parameter changing section 160 decides the parameter, when the gazing point R of the operator drags and moves into the value decision region SC.

The parameter changing section 160 detects the visual line direction of the operator on the basis of the visual line detection signal output from the visual line detection sensor 141 for the rear surface liquid crystal, and acquires the gazing point on the display screen of the liquid crystal monitor 140 for the rear surface corresponding to this visual line direction. The parameter changing section 160 is not limited to this operation, and the parameter changing section receives the visual line detection signal output from the visual line detection sensor 302 for EVF to detect the visual line direction of the operator, and acquires the gazing point on the display screen of the liquid crystal display 301 for EVF corresponding to the visual line direction. The parameter changing section 160 may continuously dispose the display position of a parameter such as the F number or the shutter speed in conjunction with the gazing point to change the parameter. That is, the parameter changing section 160 may maintain the dragged state to move the parameter following the movement of the gazing point of the operator, and may change the parameter corresponding to the dragged gazing point.

[Whole Operation of Camera]

Figure 9:
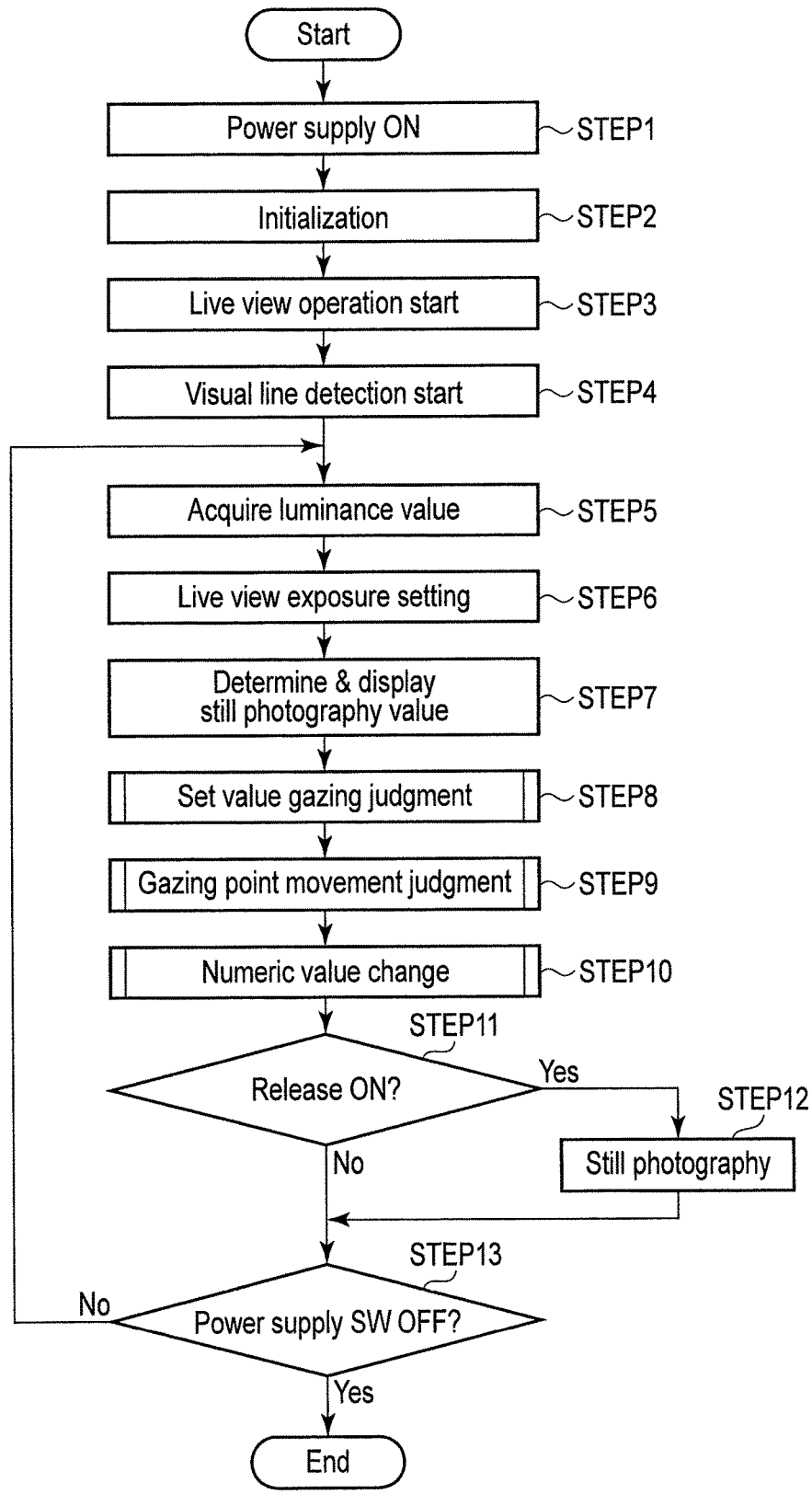
FIG. 9 is a flowchart of the whole operation of the camera.

The whole operation of the camera 10 constituted as described above will be described with reference to the whole operation flowchart shown in FIG. 9.

If the Bμcom 101 detects that the power supply is turned on (STEP 1), the Bμcom performs initialization (STEP 2) and starts a live view operation (STEP 3). In the live view operation, the luminous flux from the subject passes through the photographing lenses 210a and 210b to enter into the imaging element 111. The imaging element 111 is driven by the imaging element drive circuit 110 to continuously perform an exposure operation at a ratio of, for example, about 30 frames per second. The image data output from the imaging element 111 is sent to the image processing circuit 102.

The image processing circuit 102 performs image processing to convert the image data output from the imaging element 111 into, for example, JPEG data, and stores the image data subjected to the image processing in the recording medium 131 via the communication connector 130. The image processing circuit 102 converts the image data output from the imaging element 111 into the video signal to perform the live view display in the EVF unit 300.

If the video signal from the image processing circuit 102 is input into the liquid crystal display 301 for EVF of the EVF unit 300, the liquid crystal display unit performs the live view display of a moving image of the subject by the video signal. The live view image displayed in the liquid crystal display 301 for EVF is reflected by the half mirror 303 to reach the eye part of the operator.

Together with the start of the display of the live view image, the visual line detection sensor 302 for EVF starts to detect whether or not the operator looks into the live view displayed in the EVF unit 300, and starts the detection of the visual line direction of the operator if the operator looks into the EVF unit 300 (STEP 4).

At this time, the visual line detection sensor 141 for the rear surface liquid crystal also starts the detection of the visual line direction of the operator. The visual line detection sensor 141 for the rear surface liquid crystal photographs an image of the face part of the operator, and judges the visual line direction on the basis of one or both of the presence/absence of at least the nostril part of the face part of the operator and the pupil position of the eye part E.

The image processing circuit 102 acquires a luminance value of the subject on the basis of the image data output from the imaging element 111 (STEP 5).

The image processing circuit 102 performs processing of distance measurement and automatic focusing to the subject. Furthermore, the image processing circuit 102 performs each type of image processing to the image data, for example, the color correction processing, the γ correction processing, the compression processing, and the expansion processing to the compressed image data.

The image processing circuit 102 sets exposure value to the live view image subjected to the image processing (STEP 6).

The image processing circuit 102 determines a parameter such as the F number FN or the shutter speed SS as the exposure value of still photography, and displays the parameter such as the F number FN or the shutter speed SS on the display screen 140a of the liquid crystal monitor 140 for the rear surface (STEP 7).

The parameter changing section 160 acquires the visual line direction of the operator from the visual line detection sensor 141 for the rear surface liquid crystal, through the image processing circuit 102. The parameter changing section 160 converts the gazing point R corresponding to the visual line direction of the operator on the display screen 140a of the liquid crystal monitor 140 for the rear surface, and judges the gazing point R of the operator on the display screen 140a of the liquid crystal monitor 140 for the rear surface (STEP 8).

The parameter changing section 160 judges whether or not the gazing point R of the operator is present in the first display region H1a, H1b including the F number FN, the shutter speed SS or the like as the parameter. As a result of the judgment, if the gazing point R of the operator is in the first display region H1a, H1b, the parameter changing section 160 judges whether or not the gazing point R of the operator is present in the numeric value change region K to change the F number FN, the shutter speed SS or the like (STEP 9).

As a result of the judgment, if the gazing point R of the operator is in the numeric value change region K, the parameter changing section 160 displays such a change display region CD as shown in FIG. 7 to change a parameter such as the F number FN or the shutter speed SS, and changes the parameter such as the F number FN or the shutter speed SS (STEP 10).

Afterward, the Bµcom 101 judges whether or not a release switch of the camera operation switch 150 is turned on (STEP 11). As a result of the judgment, if the release switch turns on, the Bµcom 101 performs the still photography (STEP 12). At this time, the Bµcom 101, in response to the on-state of the release switch, controls the image processing circuit 102, the shutter control drive circuit 121, and furthermore the lens drive mechanism 204 and the diaphragm drive mechanism 202 of the lens unit 200, thereby performing the still photography.

As a result of the above judgment, if the release switch is not turned on, the Bµcom 101 judges whether or not the power supply is turned off. As a result of the judgment, if the power supply is not turned off, the Bµcom 101 returns to the STEP 5. If the power supply is turned off, the Bµcom 101 ends the operation of the camera 10.

[Parameter Gazing Judgment]

A specific operation of judging the gazing point R of the operator (STEP 8) will be described with reference to a parameter gazing judgment flowchart shown in FIG. 10.

The parameter changing section 160 judges whether or not there is set a flag (a set value gazing state flag) Fa indicating a state where the operator is gazing at a parameter such as the F number FN or the shutter speed SS (STEP 100). That is, the parameter changing section 160 acquires the visual line direction of the operator from the visual line detection sensor 141 for the rear surface liquid crystal, through the image processing circuit 102. The parameter changing section 160 converts the gazing point R corresponding to the visual line direction of the operator on the display screen 140a of the liquid crystal monitor 140 for the rear surface, and judges the gazing point R of the operator on the display screen 140a of the liquid crystal monitor 140 for the rear surface.

As a result of the judgment, if the gazing point R of the operator is present in the first display region H1a or H1b shown in FIG. 3 for the predetermined time or more, the parameter changing section 160 sets the set value gazing state flag.

On the other hand, if the gazing point R of the operator is not present in the first display region H1a or H1b for the predetermined time or more, the parameter changing section 160 does not set the set value gazing state flag Fa.

If the gazing point R of the operator is not present in the first display region H1a or H1b and the set value gazing state flag is not set, the parameter changing section 160 acquires the gazing point R of the operator on the display screen 140a of the liquid crystal monitor 140 for the rear surface on the basis of the visual line direction of the operator detected by the visual line detection sensor 141 for the rear surface liquid crystal as described above (STEP 101).

The parameter changing section 160 judges whether or not the gazing point R of the operator is present in the first display region H1a or H1b (STEP 102).

As a result of the judgment, if the gazing point R of the operator is present in the first display region H1a or H1b, the parameter changing section 160 counts up a count in a set value region by one (STEP 103).

On the other hand, if the gazing point R of the operator is not in the first display region H1a or H1b, the parameter changing section 160 clears the count in the set value region (STEP 104).

The parameter changing section 160 judges whether or not the count value of the count in the set value region is a predetermined count value or more. That is, the parameter changing section 160 judges whether or not the gazing point R of the operator is in the first display region H1a or H1b for the predetermined time or more (STEP 105).

As a result of the judgment, if the gazing point R of the operator is present in the first display region H1a or H1b for the predetermined time or more, the parameter changing section 160 sets the set value gazing state flag Fa (STEP 106).

The parameter changing section 160 changes the display mode of each parameter, i.e., the F number FN or the shutter speed SS in the first display region H1a or H1b to, for example, the highlighting as shown in FIG. 8 (STEP 107).

[Gazing Point Movement Judgment]

Figure 11:
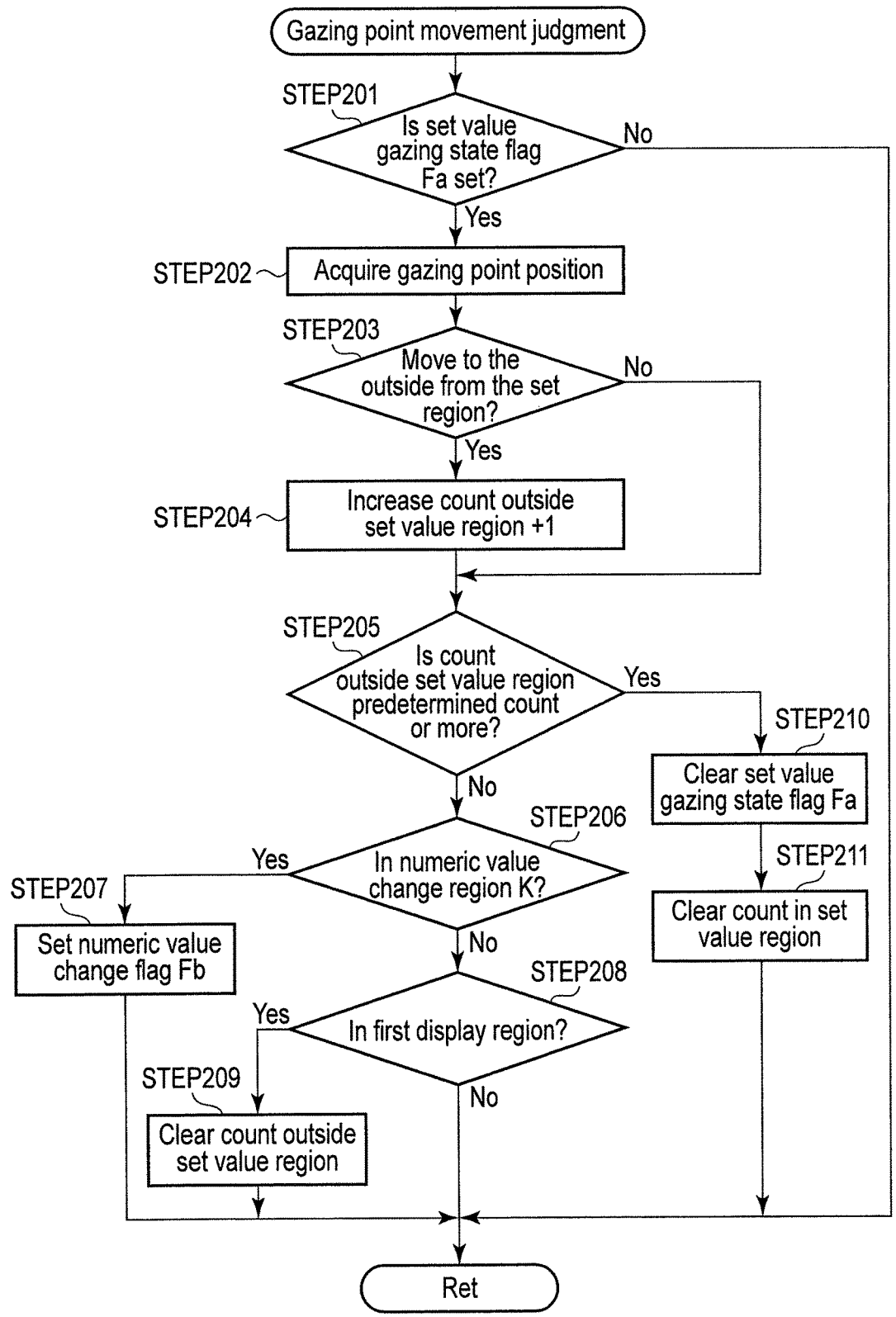
FIG. 11 is a gazing point movement judgment flowchart in the camera.

A specific operation of judging whether or not the gazing point R of the operator is present in the numeric value change (state switch) region K (STEP 9) will be described with reference to a gazing point movement judgment flowchart shown in FIG. 11.

The parameter changing section 160 judges whether or not the set value gazing state flag Fa is set (STEP 201).

As a result of the judgment, if the set value gazing state flag Fa is set, the parameter changing section 160 acquires the gazing point R of the operator on the display screen 140a of the liquid crystal monitor 140 for the rear surface on the basis of the visual line direction of the operator detected by the visual line detection sensor 141 for the rear surface liquid crystal as described above (STEP 202).

Similarly to the above, the parameter changing section 160 successively acquires the gazing point R of the operator on the basis of the visual line direction of the operator detected by the visual line detection sensor 141 for the rear surface liquid crystal, and the section judges whether or not the gazing point R of the operator has moved from the first display region H1a or H1b to the outside of the region (STEP 203). That is, similarly to the above, the parameter changing section 160 successively acquires the gazing point R of the operator on the basis of the visual line direction of the operator detected by the visual line detection sensor 141 for the rear surface liquid crystal, and moves onto the display screen 140a of the liquid crystal monitor 140 for the rear surface in conjunction with the movement of the gazing point R.

As a result of the above judgment, when the gazing point R of the operator moves to the outside of the first display region H1a or H1b, the parameter changing section 160 counts up a count outside the set value region by one (STEP 204).

The parameter changing section 160 judges whether or not the count value of the count outside the set value region is the predetermined count value or more (STEP 205).

As a result of the judgment, if the count value of the count outside the set value region is not the predetermined count value or more, the parameter changing section 160 judges whether or not the gazing point R of the operator is present in the numeric value change region K shown in FIG. 5. That is, the parameter changing section 160 judges whether or not the gazing point R of the operator moves from, for example, a coordinate (Xeye, Yeye) in the first display region H1a to a coordinate (Xeye1, Yeye1) in the numeric value change region K and is present in the numeric value change region K for the predetermined time or more (STEP 206).

As a result of the judgment, if the gazing point R of the operator is present in the numeric value change (state switch) region K for the predetermined time or more, the parameter changing section 160 sets a numeric value change flag Fb (STEP 207).

On the other hand, if the gazing point R of the operator is not present in the numeric value change (state switch) region K for the predetermined time or more, the parameter changing section 160 judges whether or not the gazing point R of the operator is present in the first display region H1a or H1b (STEP 208).

As a result of the judgment, if the gazing point R of the operator is present in the first display region H1a or H1b, the parameter changing section 160 clears the count value of the count outside the set value region (STEP 209).

If the count value of the count outside the set value region is not the predetermined count value or more (STEP 205), the parameter changing section 160 clears the set value gazing state flag Fa (STEP 210), and clears the count value of the count in the set value region (STEP 211).

[Numeric Value Change]

Figure 12A:
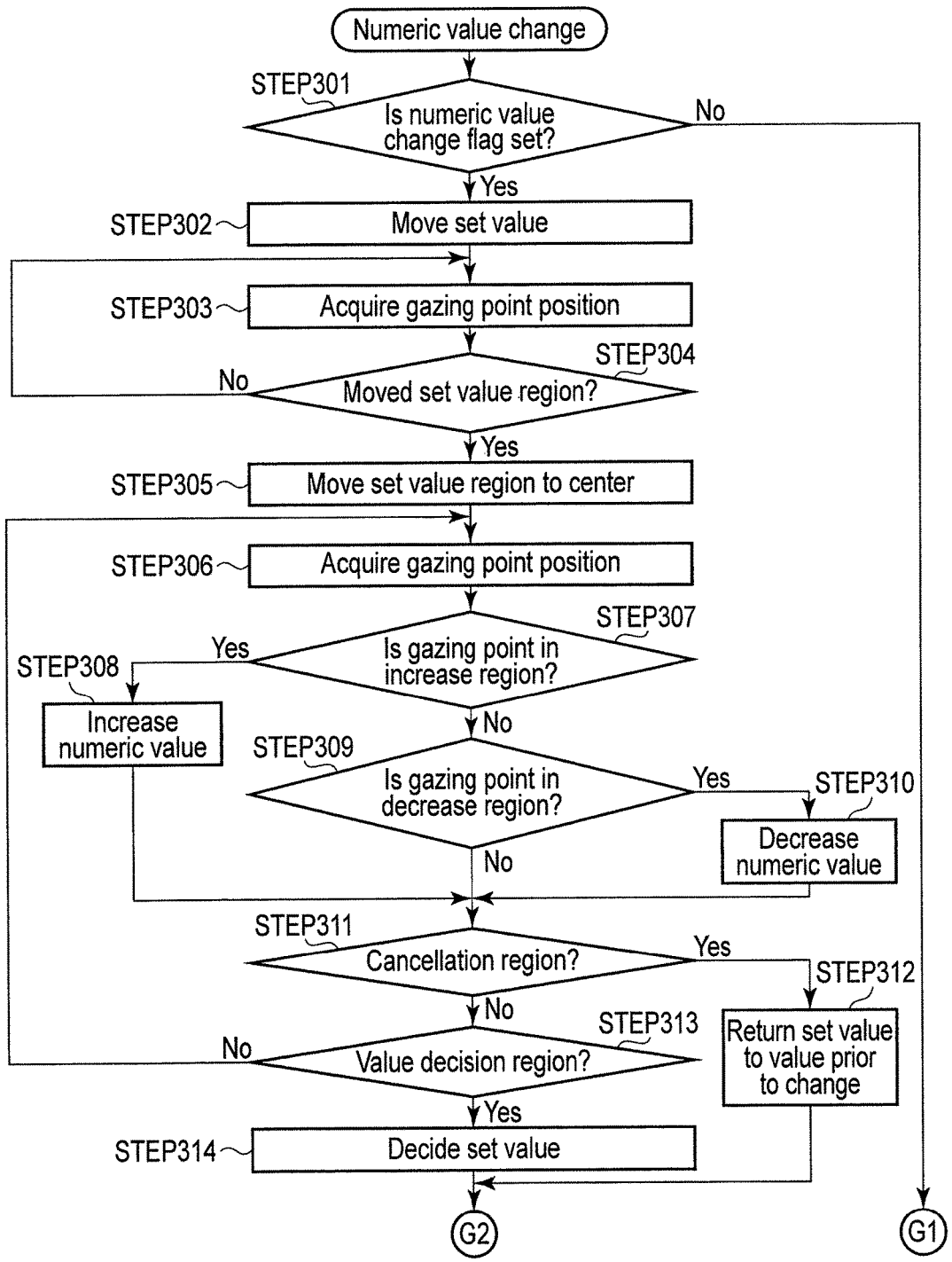
FIG. 12A is a numeric value changing flowchart in the camera.
Figure 12B:
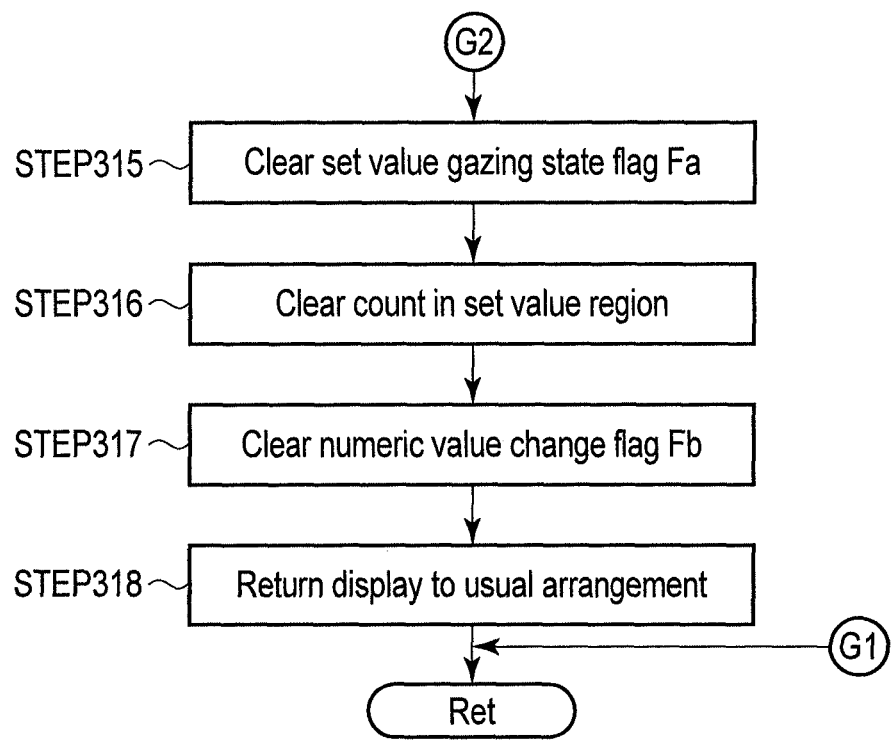
FIG. 12B is a numeric value changing flowchart in the camera.

A specific operation of changing a parameter such as the F number FN or the shutter speed SS (STEP 10) will be described with reference to a numeric value changing flowchart shown in FIG. 12A and FIG. 12B.

The parameter changing section 160 judges whether or not a numeric value change flag is set (STEP 301). In the STEP 207, the parameter changing section 160 judges that the gazing point R of the operator is present in the numeric value change region K for the predetermined time or more, to set the numeric value change flag Fb.

Figure 13:
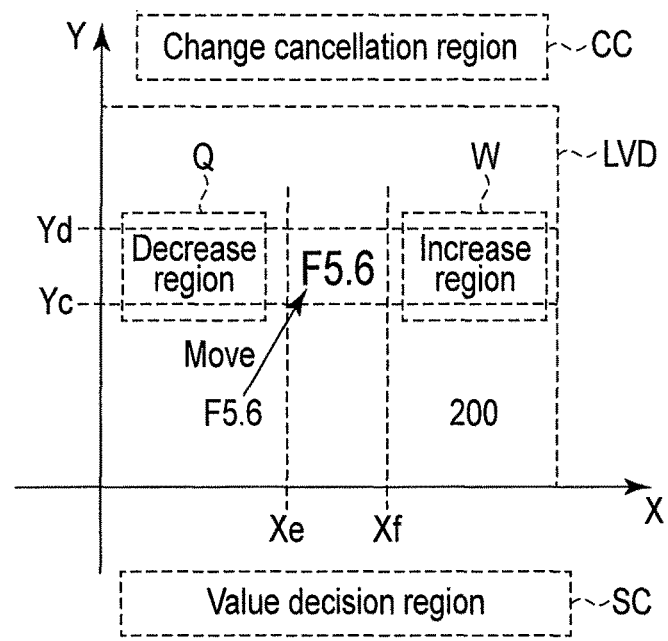
FIG. 13 is a view showing movement of the parameter to a central portion of the change display region by a parameter changing section of the camera.

As a result of the judgment, if the numeric value change flag is set, the parameter changing section 160 displays such a change display region CD as shown in FIG. 13 in the display screen 140a of the liquid crystal monitor 140 for the rear surface, and moves the numeric value of the F number FN in the first display region H1a to a central portion of the change display region CD (STEP 302).

Similarly to the above, the parameter changing section 160 acquires the gazing point R of the operator on the display screen 140a of the liquid crystal monitor 140 for the rear surface on the basis of the visual line direction of the operator detected by the visual line detection sensor 141 for the rear surface liquid crystal (STEP 303).

Figure 14:
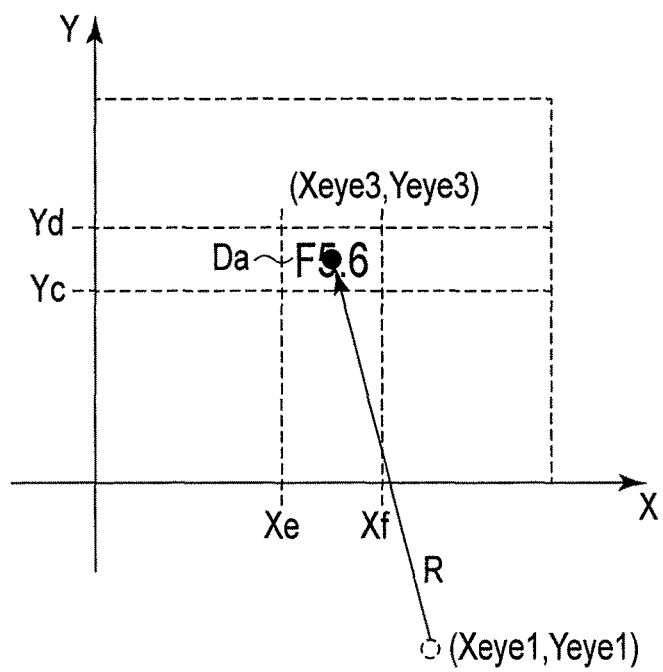
FIG. 14 is a view showing judgment of whether or not an operator's gazing point is present in a region including the parameter moved to the central portion of the change display region, by the parameter changing section of the camera.

The parameter changing section 160 judges whether or not the acquired gazing point R of the operator is present in a change start region Da including the numeric value of the F number FN moved to the central portion of the change display region CD as shown in FIG. 14 (STEP 304). At this time, the gazing point R of the operator moves from the gazing point R (Xeye1, Yeye1) to a gazing point R (Xeye3, Yeye3) in the change start region Da. The gazing point R (Xeye1, Yeye1) prior to the movement is present in the numeric value change region K as shown in FIG. 5.

The parameter changing section 160 repeats the STEPs 303, 304 and judges whether or not the gazing point R of the operator is present in the change start region Da for a predetermined time.

As a result of the judgment, if the gazing point R of the operator is present in the change start region Da, the parameter changing section 160 moves, for example, the first display region H1a including the numeric value of the F number FN to the central portion of the change display region CD as shown in FIG. 14 (STEP 305).

If the first display region H1a or H1b including a parameter such as the F number FN moves to the central portion of the change display region CD as described above, the parameter changing section 160 starts the dragged state Where the parameter such as the F number FN is moved on the display screen 140a of the liquid crystal monitor 140 for the rear surface, following the movement of the gazing point R of the operator on the display screen 140a of the liquid crystal monitor 140 for the rear surface.

Similarly to the above, the parameter changing section 160 acquires the gazing point R of the operator on the display screen 140a of the liquid crystal monitor 140 for the rear surface on the basis of the visual line direction of the operator detected by the visual line detection sensor 141 for the rear surface liquid crystal (STEP 306).

The parameter changing section 160 judges whether or not the gazing point R of the operator moves and is present in the increase region W as shown in, for example, FIG. 15 (STEP 307). That is, when the gazing point R of the operator detected by the visual line detection sensor 141 for the rear surface liquid crystal is present at a coordinate (Xeye4, Yeye4), the parameter changing section 160 judges that the gazing point R of the operator is present in the increase region W.

If the gazing point R of the operator is present in the increase region W, the parameter changing section 160 increases, for example, the numeric value of the F number FN as the parameter (STEP 308). If the numeric value of the F number FN is set to, for example, (F: 2, 2.8, 4, 5.6, 8, 11), the parameter changing section 160 increases the numeric value of the F number FN in order of (F: 2→2.8→4→5.6→8→11). If the numeric value of the F number FN reaches (11), the parameter changing section 160 may return to the numeric value (2), and increase the numeric value in order of (F: 2.8→4→5.6→8→11) again.

On the other hand, if the gazing point R of the operator is not present in the increase region W, the parameter changing section 160 judges whether or not the gazing point R of the operator moves and is present in the decrease region Q as shown in, for example, FIG. 16 (STEP 309). That is, if the gazing point R of the operator detected by the visual line detection sensor 141 for the rear surface liquid crystal is present at a coordinate (Xeye5, Yeye5), the parameter changing section 160 judges that the gazing point R of the operator is present in the decrease region Q.

If the gazing point R of the operator is present in the decrease region Q, the parameter changing section 160 decreases, for example, the numeric value of the F number FN as the parameter (STEP 310). If the numeric value of the F number FN is set to, for example, (F: 2, 2.8, 4, 5.6, 8, 11), the parameter changing section 160 decreases the numeric value of the F number FN in order of (F: 11→8→5.6→4→2.8→2). If the numeric value of the F number FN reaches (F2), the parameter changing section 160 may return to the numeric value (F11), and decrease the numeric value in order of (F: 8→5.6→4→2.8→2) again.

If the change by the increase or decrease of the numeric value of, for example, the F number FN as the parameter ends, the parameter changing section 160, similarly to the above, acquires the gazing point R of the operator on the display screen 140a of the liquid crystal monitor 140 for the rear surface on the basis of the visual line direction of the operator detected by the visual line detection sensor 141 for the rear surface liquid crystal, and judges whether or not the gazing point R of the operator is present in the change cancellation region CC (STEP 311).

Figure 17:
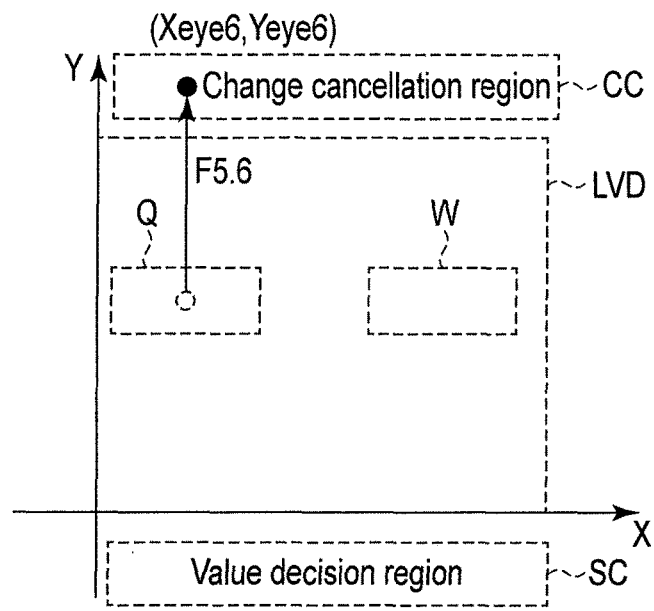
FIG. 17 is a view showing that the operator's gazing point has moved into a change cancellation region in the camera.
Figure 18:
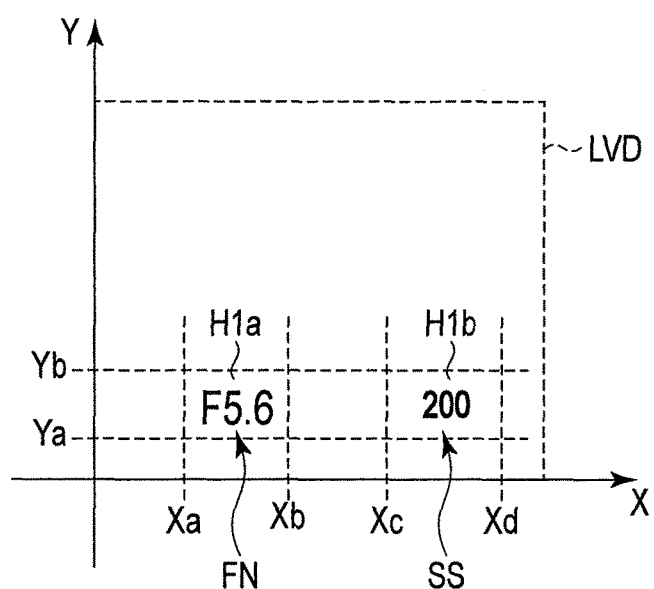
FIG. 18 is a view showing cancellation of the parameter (the F number) in the camera.

As a result of the judgment, if the gazing point R of the operator is present in the change cancellation region CC, the parameter changing section 160 returns, for example, the numeric value of the F number FN as the parameter back to the numeric value prior to the change (STEP 312). FIG. 17 shows that the gazing point R of the operator is moved to a coordinate (Xeye6, Yeye6) in the change cancellation region CC. FIG. 18 shows that, for example, the numeric value of the F number FN is returned to the numeric value F5.6 prior to the change.

The parameter changing section 160 highlights the numeric value F5.6 of the F number FN returned to the value prior to the change. In the highlighting, the numeric value (F5.6) of the F number FN is displayed in bold characters and a font size is enlarged. The highlighting of the parameter is not limited to the bold characters having the large font size, and may be performed by the display color, the blinking or the like.

On the other hand, if the gazing point R of the operator is not present in the change cancellation region CC, the parameter changing section 160 judges whether or not the gazing point R of the operator is present in the value decision region SC (STEP 313).

As a result of the judgment, if the gazing point R of the operator is present in the value decision region SC, the parameter changing section 160 decides, for example, the numeric value of the F number FN as the changed parameter (STEP 314). FIG. 19 shows that the gazing point R of the operator moves to a coordinate (Xeye7, Yeye7) in the value decision region SC. FIG. 20 shows, for example, the numeric value F2 obtained by changing the numeric value of the changed F number FN. The parameter changing section 160 highlights the changed numeric value F2 of the F number FN. In the highlighting, the numeric value (F5.6) of the F number FN is displayed in the bold characters and the font size is enlarged. The highlighting of the parameter is not limited to the bold characters having the large font size, and may be performed by the display color, the blinking or the like.

If the gazing point R of the operator is not present in the value decision region SC, the parameter changing section 160 returns to the STEP 306.

The parameter changing section 160 clears the set value gazing state flag Fa (STEP 315).

The parameter changing section 160 clears the count in the set value region and the count outside the set value region (STEP 316).

The parameter changing section 160 clears the numeric value change flag Fb (STEP 317).

The parameter changing section 160 returns the display to usual arrangement (STEP 318). In the usual arrangement display for example, as described above with reference to FIG. 2, the parameters, for example, the F number FN (F5.6) and the shutter speed SS (200) are displayed together with a subject such as the landscape on the display screen 140a of the liquid crystal monitor 140 for the rear surface.

As described above, according to the first embodiment, a parameter such as F number FN or the shutter speed SS is displayed on the display screen 140a of the liquid crystal monitor 140 for the rear surface, and the visual line direction of the operator is detected on the basis of the visual line detection signal output from the visual line detection sensor 141 for the rear surface liquid crystal, to change the parameter on the basis of the movement of the gazing point R of the operator on the display screen 140a of the liquid crystal monitor 140 for the rear surface corresponding to the visual line direction.

Specifically, the parameter changing section 160 judges whether or not the gazing point R of the operator is present in the first display region H1a, H1b including the F number FN, the shutter speed SS or the like. If the gazing point is present in the first display region H1a, H1b, the parameter changing section judges whether or not a parameter such as the F number FN or the shutter speed SS is present in the numeric value change region K by the drag movement of the gazing point R of the operator. If the gazing point is present in the numeric value change region K, the parameter changing section displays the change display region CD to change the parameter such as the F number FN or the shutter speed SS, and increases and decreases the parameter such as the F number FN or the shutter speed SS by the change display region CD.

In consequence, the operator drags and moves the numeric value of a parameter such as the F number FN or the shutter speed SS, while gazing at the numeric value, so that the operator can perform the increase, decrease or the like of the parameter. An operability of the parameter change improves, and an operation of changing the parameter can quickly and simply be performed.

The arrangement direction (the X-axis direction) of the increase region W and the decrease region Q and the arrangement direction (the Y-axis direction) of the value decision region SC and the change cancellation region CC are displayed in a positional relation of the mutually vertical direction. Therefore, a direction in which the operator moves the visual line is turned to a right-left direction by increasing or decreasing the parameter, and the direction is turned to an upward-downward direction by deciding or cancelling the parameter. In consequence, an operation of increasing or decreasing the numeric value of a parameter such as the F number FN or the shutter speed SS and an operation of changing or canceling the setting of the parameter are easy to understand, and an erroneous operation is eliminated.

In the above example, if the visual line position of the operator is present in the numeric value change region K, the change display region CD is displayed, but the present invention is not limited to this example, and the change display region CD may be displayed together with the live view display region LVD and the numeric value change region K.

For the change of the parameter, the parameter is changed by moving a parameter such as the F number FN or the shutter speed SS to the change display region CD corresponding to an instruction of change contents of the parameter. The present invention is not limited to this example. For the change of the parameter, the instruction indicating the change contents of the parameter may be displayed, and the instruction may be moved onto a parameter such as the F number FN or the shutter speed SS, to change the parameter along the change contents of the instruction. The change of the parameter may be performed by using the image displayed on the display screen 140a of the liquid crystal monitor 140 for the rear surface.

Second Embodiment

A second embodiment of the present invention will be described with reference to the drawings. It is to be noted that in the present second embodiment, the same part as in the above first embodiment is denoted with the same reference symbols, detailed description thereof is omitted, and differences will be described.

FIG. 21 shows a change display region CD to change a parameter such as an F number FN or a shutter speed SS. The change display region CD is displayed in a live view display region LVD. In the change display region CD, a value decision region SC is displayed in a central portion of the change display region CD. On right and left sides of the value decision region SC, an increase region W and a decrease region Q are displayed. Above the value decision region SC, a change cancellation region CC is displayed.

The change display region CD may be set to a region including the outside of the live view display region LVD or the inside and outside of the live view display region LVD. For example, the change display region CD may be disposed to project over the outside of the live view display region LVD as shown in FIG. 22. The change cancellation regions CC are arranged at four positions to surround the outside of the live view display region LVD. For example, the upside change cancellation region CC is disposed so that a partial region thereof overlaps with the live view display region LVD.

[Numeric Value Change]

Figure 23:
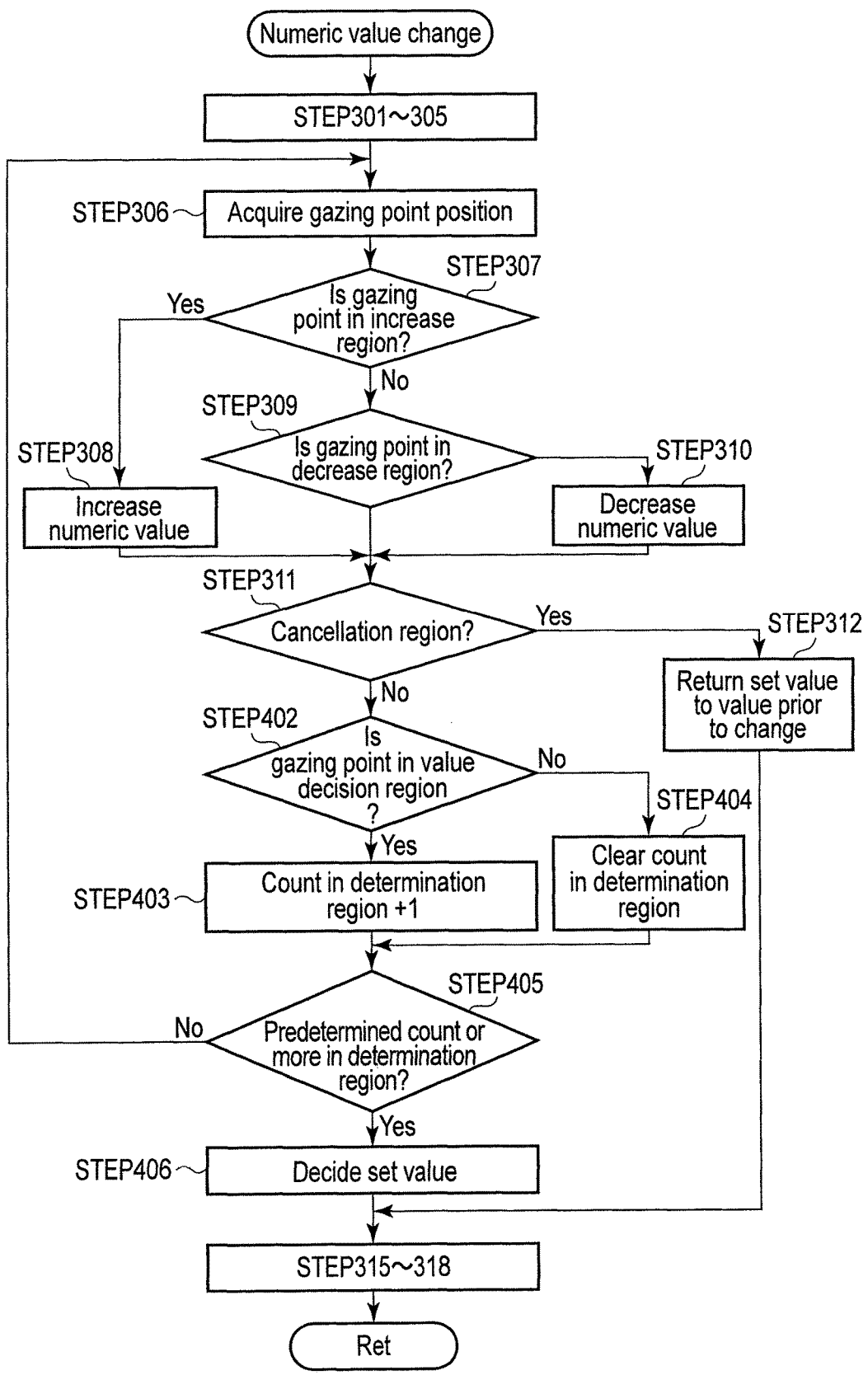
FIG. 23 is a numeric value changing flowchart in the camera.

For a specific operation of changing the parameter by use of the change display region CD constituted as described above (STEP 10), steps different from those of the numeric value changing flowchart shown in FIG. 12A and FIG. 12B will be described with reference to a numeric value changing flowchart shown in FIG. 23.

Similarly to the above, a parameter changing section 160 judges whether or not a gazing point R of an operator is present in the change cancellation region CC (STEP 311).

As a result of the judgment, if the gazing point R of the operator is not present in the change cancellation region CC, the parameter changing section 160 judges whether or not the gazing point R of the operator is present in the value decision region SC (STEP 402).

As a result of the judgment, if the gazing point R of the operator is present in the value decision region SC, the parameter changing section 160 counts up a count in the determination region by "1" (STEP 403).

On the other hand, if the gazing point R of the operator is not present in the value decision region SC, the parameter changing section 160 clears the count in the determination region (STEP 404).

The parameter changing section 160 judges whether or not a count value of the count in the determination region is a predetermined count value or more (STEP 405). That is, the parameter changing section 160 judges whether or not the gazing point R of the operator is present in the value decision region SC for a predetermined time or more.

As a result of the judgment, if the count value of the count in the determination region is the predetermined count value or more, the parameter changing section 160 determines, for example, a numeric value of an F number FN as the changed parameter (STEP 406).

Similarly to the above, the parameter changing section 160 executes the STEP 315 to the STEP 318.

As described above, according to the second embodiment, also if in the change display region CD, the value decision region SC is displayed in the central portion of the change display region CD, the increase region W and the decrease region Q are displayed on the right and left sides of the value decision region SC and the change cancellation region CC is displayed above the value decision region SC, an effect similar to that of the first embodiment can be produced.

Third Embodiment

A third embodiment of the present invention will be described with reference to the drawings. It is to be noted that in the present third embodiment, the same part as in the above first embodiment is denoted with the same reference symbols, detailed description thereof is omitted, and differences will be described.

Figure 24:
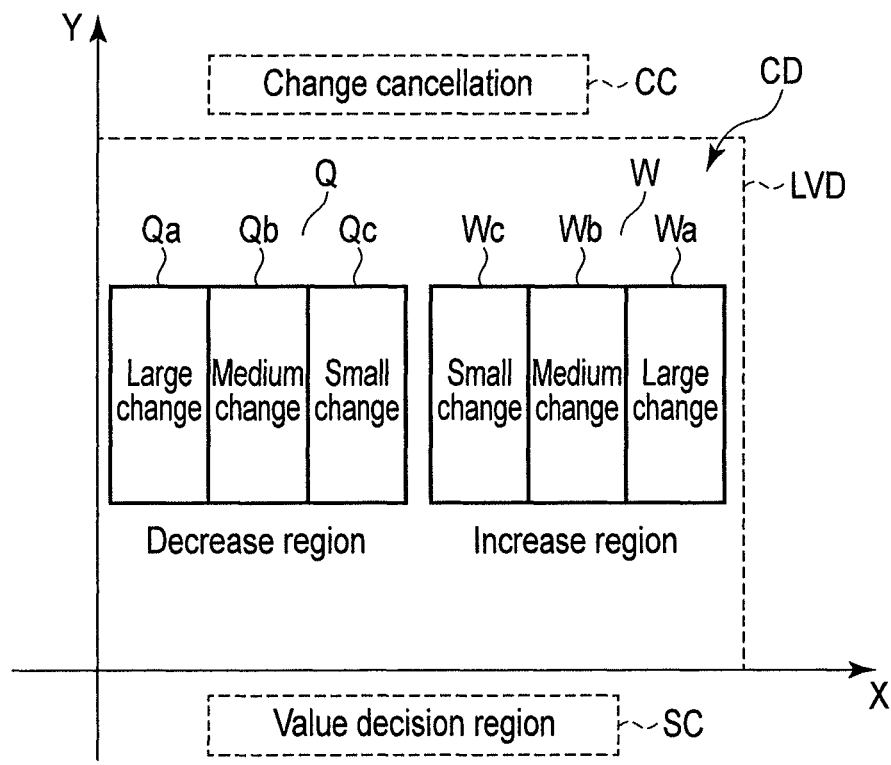
FIG. 24 is a schematic view showing a change display region displayed by a digital single lens reflex camera to which a third embodiment of the parameter changing device according to the present invention is applied.

FIG. 24 shows a constitution of a change display region CD. In the change display region CD, a decrease amount of a parameter by a decrease region Q and an increase amount of the parameter by an increase region W are provided with stages, respectively.

In the decrease region Q, the decrease amount of the parameter is provided in, for example, three stages of large, medium and small amounts. The decrease amount of the parameter has a region Qa of a large decrease amount, a region Qb of a medium decrease amount, and a region Qc of a small decrease amount. In the region Qa of the large decrease amount, a numeric value is increased by, for example, −1 step/s, i.e., the numeric value is decreased by step/s. In the region Qb of the medium decrease amount, the numeric value is increased by, for example, −0.5 step/s, i.e., the numeric value is decreased by 0.5 step/s. In the region Qc of the small decrease amount, the numeric value is increased by, for example, −0.33 step/s, i.e., the numeric value is decreased by 0.33 step/s.

In the increase region W, the increase amount of the parameter is provided in, for example, three stages of large, medium and small amounts. The increase amount of the parameter has a region Wa of a large increase amount, a region Wb of a medium increase amount, and a region Wc of a small increase amount. In the region Wa of the large increase amount, the numeric value is increased by, for example, 1 step/s. In the region Wb of the medium increase amount, the numeric value is increased by, for example, 0.5 step/s. In the region Wc of the small increase amount, the numeric value is increased by, for example, 0.33 step/s.

The parameter changing section 160 increases or decreases the parameter by the variably set amount of the increase amount or the decrease amount of the parameter, when the gazing point R of the operator enters into the increase region W or the decrease region Q.

[Numeric Value Change]

Figure 25A:
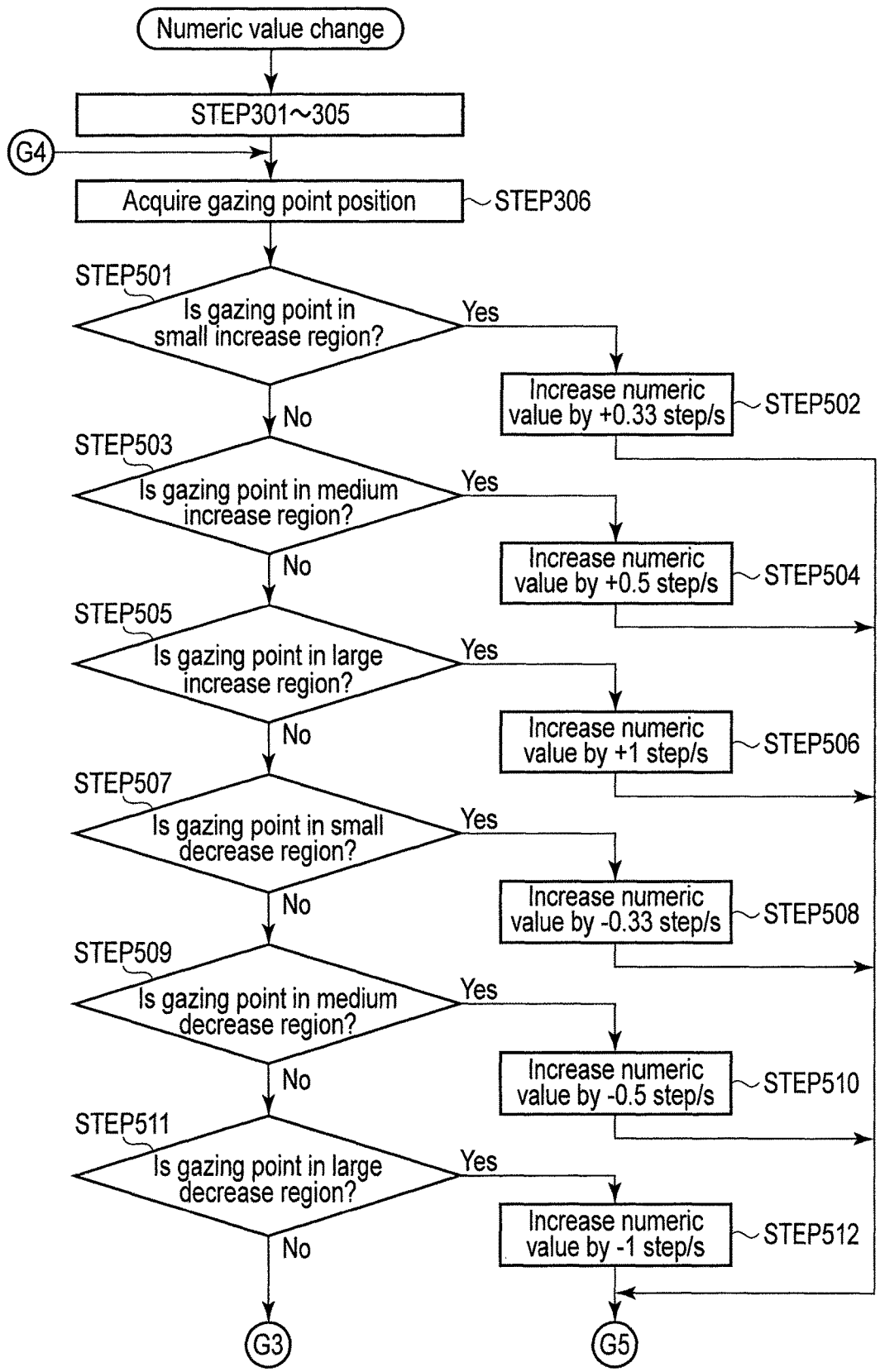
FIG. 25A is a numeric value changing flowchart in the camera.
Figure 25B:
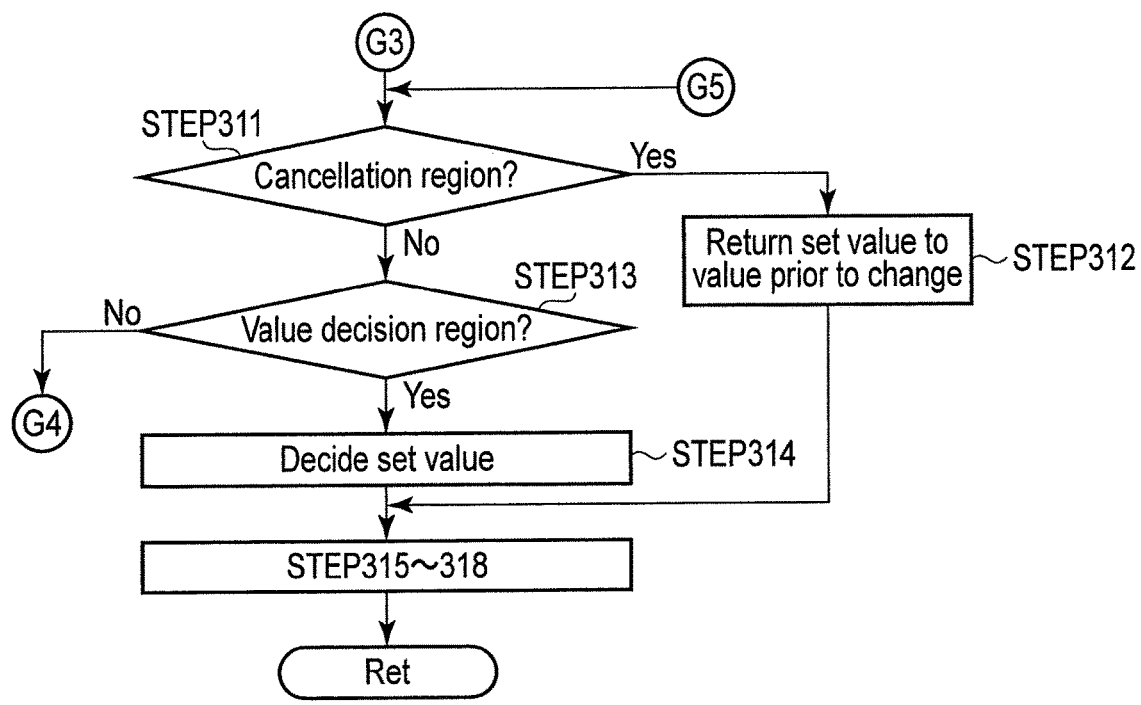
FIG. 25B is a numeric value changing flowchart in the camera.

For a specific operation of changing the parameter by use of the change display region CD constituted as described above (STEP 10), steps different from those of the numeric value changing flowchart shown in FIG. 12A and FIG. 12B will be described with reference to numeric value changing flowcharts shown in FIG. 25A and FIG. 25B.

Similarly to the above, a parameter changing section 160 acquires a gazing point R of an operator on a display screen 140a of a liquid crystal monitor 140 for a rear surface on the basis of a visual line direction of the operator detected by a visual line detection sensor 141 for a rear surface liquid crystal (STEP 306).

The parameter changing section 160 judges whether or not the gazing point R of the operator is present in the region Wc of the small increase amount (STEP 501). As a result of the judgment, if the gazing point R of the operator is present in the region Wc of the small increase amount, the parameter changing section 160 increases a numeric value of a parameter such as an F number FN or a shutter speed SS by, for example, 0.33 step/s (STEP 502).

If the gazing point R of the operator is not in the region Wc of the small increase amount, the parameter changing section 160 judges whether or not the gazing point R of the operator is present in the region Wb of the medium increase amount (STEP 503). As a result of the judgment, if the gazing point R of the operator is present in the region Wc of the small increase amount, the parameter changing section 160 increases the numeric value of a parameter such as the F number FN or the shutter speed SS by, for example, 0.5 step/s (STEP 504).

If the gazing point R of the operator is not present in the region Wb of the medium increase amount, the parameter changing section 160 judges whether or not the gazing point R of the operator is present in the region Wa of the large increase amount (STEP 505). As a result of the judgment, if the gazing point R of the operator is present in the region Wa of the large increase amount, the parameter changing section 160 increases the numeric value of a parameter such as the F number FN or the shutter speed SS by, for example, 1 step/s (STEP 506).

If the gazing point R of the operator is not present in the region Wa of the large increase amount, the parameter changing section 160 judges whether or not the gazing point R of the operator is present in the region Qc of the small decrease amount (STEP 507). As a result of the judgment, if the gazing point R of the operator is present in the region Qc of the small decrease amount, the parameter changing section 160 increases the numeric value of a parameter such as the F number FN or the shutter speed SS by, for example, −0.33 step/s (STEP 508).

If the gazing point R of the operator is not present in the region Qc of the small decrease amount, the parameter changing section 160 judges whether or not the gazing point R of the operator is present in the region Qb of the medium decrease amount (STEP 509). As a result of the judgment, if the gazing point R of the operator is present in the region Qb of the medium decrease amount, the parameter changing section 160 increases the numeric value of a parameter such as the F number FN or the shutter speed SS by, for example, −0.5 step/s (STEP 510).

If the gazing point R of the operator is not present in the region Qb of the medium decrease amount, the parameter changing section 160 judges whether or not the gazing point R of the operator is present in the region Qa of the large decrease amount (STEP 511).

As a result of the judgment, if the gazing point R of the operator is present in the region Qa of the large decrease amount, the parameter changing section 160 increases the numeric value of a parameter such as the F number FN or the shutter speed SS by, for example, −1 step/s (STEP 512).

Hereafter, the parameter changing section 160 executes the STEP 311 to the STEP 318 similarly to the above.

As described above, according to the third embodiment, in the change display region CD, for the decrease amount of the parameter, the decrease region Q is provided with the region Qa of the large decrease amount, the region Qb of the medium decrease amount and the region Qc of the small decrease amount. Furthermore, the increase region W is provided with the region Wa of the large increase amount, the region Wb of the medium increase amount and the region Wc of the small increase amount. Therefore, an effect similar to that of the first embodiment can be produced. The decrease amount and increase amount of the parameter can be set to desirable amounts, respectively, and a parameter such as the F number FN or the shutter speed SS can be changed and set to an optimum numeric value for the imaging of the subject.

Fourth Embodiment

A fourth embodiment of the present invention will be described with reference to the drawings. It is to be noted that in the present fourth embodiment, the same part as in the above first embodiment is denoted with the same reference symbols, detailed description thereof is omitted, and differences will be described.

A parameter changing section 160 displays a list of a series of parameters such as an F number FN and a shutter speed SS in a change display region CD. The parameter changing section 160 includes at least increase and decrease regions to increase and decrease the parameters. If a gazing point R of an operator moves into the increase or decrease region, the parameter changing section 160 moves the parameters in conjunction with the gazing point to display the increase or the decrease. The parameter changing section 160 selects the parameter corresponding to the gazing point R from the parameters displayed in the list.

Figure 26:
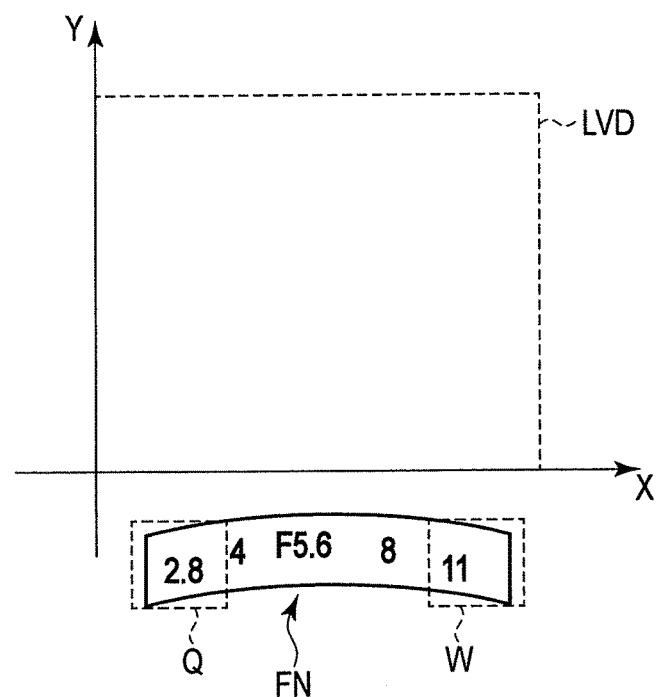
FIG. 26 is a view showing an example of a ring-like display of numeric values of parameters displayed by a digital single lens reflex camera to which a fourth embodiment of the parameter changing device according to the present invention is applied.

FIG. 26 shows a display example of numeric values of in a parameter such as the F number FN or the shutter speed SS by the parameter changing section 160. The parameter changing section 160 stores the numeric values of the parameter such as the F number FN or the shutter speed SS as parameter data arranged in an endless manner. That is, the parameter changing section 160 arranges the series of parameter numeric values in a ring form in accordance with a size of each numeric value, and displays part of the numeric values on a display screen 140a of a liquid crystal monitor 140 for a rear surface. Specifically, the numeric values of the parameter such as the F number FN are arranged in, for example, the endless ring form in accordance with an arrangement order of (F: 2→2.8→4→5.6→8→11→2).

The parameter changing section 160 displays a list of a series of parameters arranged in the ring form, for example, a part of the F number FN in the change display region CD on the display screen 140a of the liquid crystal monitor 140 for the rear surface. The parameter changing section 160 moves and displays the parameters in conjunction with the gazing point R of the operator onto at least an increase region W or a decrease region Q to increase or decrease the parameters.

If the parameter changing section 160 moves, for example, the F number FN in order of (F: 2→2.8→4→5.6→8→11), the F number FN increases. If the parameter changing section 160 moves, for example, the F number FN in order of (F: 11→8→5.6→4→2.8→2), the F number FN decreases. The parameter changing section 160 selects the parameter on the basis of the movement of the gazing point R of the operator on the moved and displayed series of parameters. The parameter changing section 160 selects the parameter corresponding to the gazing point R of the operator from the parameters.

In this case, the parameter changing section 160 moves a series of F number FN (F: 2→2.8→4→5.6→8→11→2) in a state where the ring-like arrangement order is kept, in conjunction with the movement of the gazing point R of the operator on the display screen 140a of the liquid crystal monitor 140 for the rear surface, i.e., the movement of the gazing point onto the increase region W or the decrease region Q. That is, the parameter changing section rotates and moves the series of F number FN (F: 2→2.8→4→5.6→8→11→2) in the state where the ring-like arrangement is kept.

Figure 27:
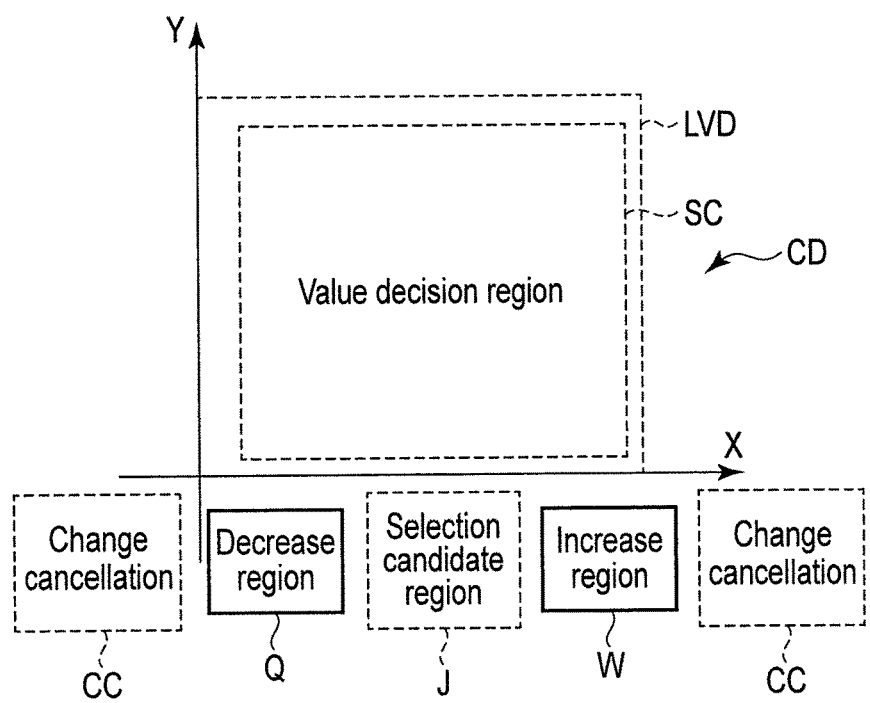
FIG. 27 is a schematic view showing the change display region in the camera.

The parameter changing section 160 displays the change display region CD shown in FIG. 27 so that the change display region is superimposed on a function of displaying the parameter on the display screen 140a of the liquid crystal monitor 140 for the rear surface shown in FIG. 26, for example, the numeric values of the F number FN. For the change display region CD, a value decision region SC is displayed in a live view display region LVD. Below the value decision region SC, there are displayed the increase region W, the decrease region Q, two change cancellation regions CC, and a selection candidate region J. In the change display region CD, the selection candidate region J is displayed in a central portion, the increase region W and the decrease region Q are displayed on both sides of the selection candidate region J, respectively, and the change cancellation regions CC are displayed on further outer sides, respectively.

The selection candidate region J is displayed between the increase region W and the decrease region Q. In the selection candidate region J, it is regarded that the numeric value of parameter such as the F number FN or the shutter speed SS present in the selection candidate region J is a candidate of the parameter to be changed and set.

The change display region CD is superimposed on the ring-like parameter display shown in FIG. 26. That is, the series of numeric values of a parameter such as the F number FN which are arranged in the ring form are superimposed on the value decision region SC, the increase region W, the decrease region Q, the respective change cancellation regions CC and the selection candidate region J of the change display region CD. In consequence, as shown in FIG. 26, both end portions of, for example, the F number FN as the parameter of the ring form are superimposed on the increase region W and the decrease region Q, respectively.

Figure 28:
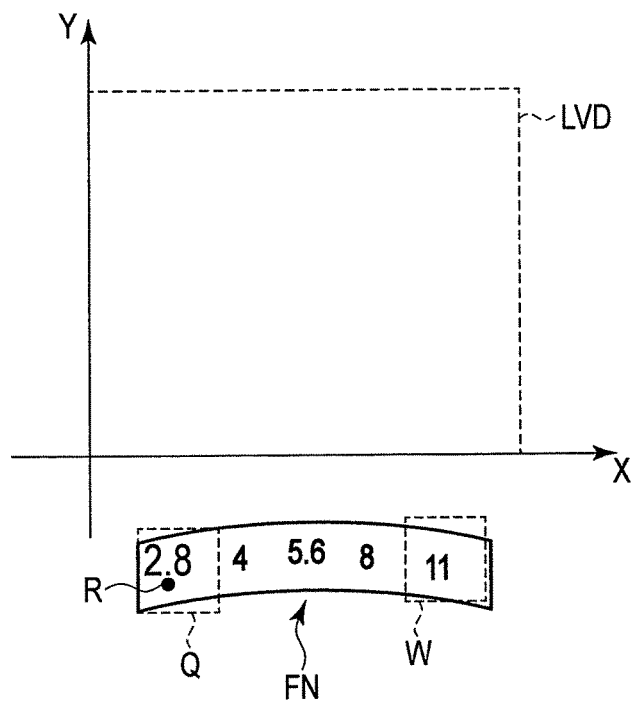
FIG. 28 is a view showing highlighting in a decrease region by the parameter changing section in the camera.

The parameter changing section 160 acquires the gazing point R of the operator, and judges whether or not the gazing point R of the operator is present in one of the increase region W and the decrease region Q, for example, the decrease region Q as shown in FIG. 28. If the gazing point R of the operator is present in the decrease region Q, the parameter changing section 160 changes a display mode of the parameter present in the decrease region Q, i.e., the F number FN (F2.8) herein, and performs, for example, highlighting as shown in FIG. 28. In the highlighting, the numeric value of the F number FN (F2.8) is displayed in bold characters and a font size is enlarged. For the change of the display mode of the parameter, display color may be changed, or the display mode may be changed to blinking or the like.

Figure 29:
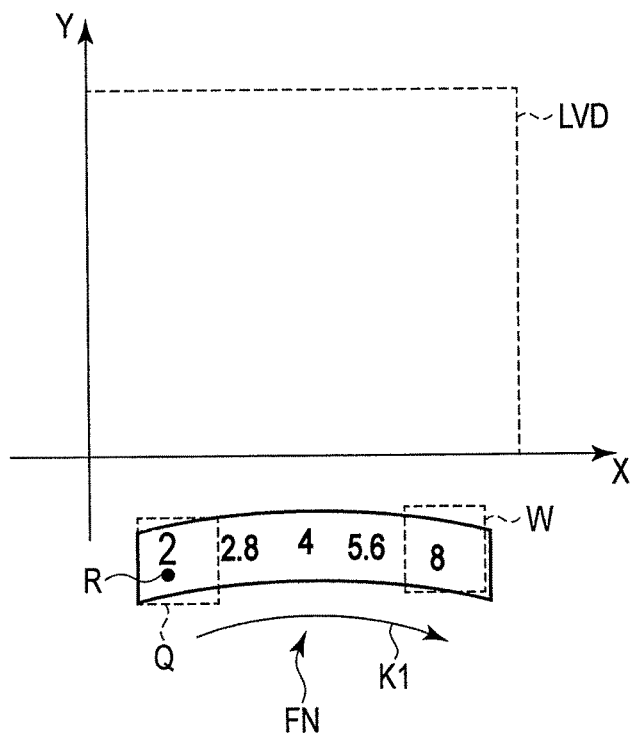
FIG. 29 is a view showing a ring-like parameter rotary display by the parameter changing section in the camera.

The parameter changing section 160 highlights the F number FN (F2.8), and then moves the parameter of the ring form, for example, the F number FN at a constant speed in a direction K1 in which the numeric value of the F number decreases, as shown in FIG. 29. The F numbers FN (F: 2, 2.8, 4, 5.6, 8, 11, 2) are arranged in the ring form, and hence the parameter changing section 160 rotates and moves the F number FN at the constant speed in the decrease direction K1.

The parameter changing section 160 acquires the gazing point R of the operator, and highlights an F number FN (4), if the gazing point R of the operator is present in the parameter of the ring form, for example, the F number FN "F4" shown in FIG. 30. Subsequently, the parameter changing section 160 acquires the gazing point R of the operator, and changes the F number FN from (F2.8) prior to the change to (F4), if the gazing point R of the operator is present in the value decision region SC.

The parameter changing section 160 acquires the gazing point R of the operator, and judges whether or not the gazing point R of the operator is present in one of the increase region W and the decrease region Q. As a result of the judgment, if it is judged that the gazing point is present in, for example, the increase region W as shown in FIG. 31, the parameter changing section 160 highlights the parameter present in the increase region W as shown in FIG. 31, i.e., an F number FN (F1.1) herein. In the highlighting, the numeric value of the F number FN (F1.1) is displayed in bold characters and a font size is enlarged. The highlighting of this parameter may be performed by the display color, the blinking or the like.

The parameter changing section 160 highlights the F number FN (F1.1), and then moves the parameter of the ring form, for example, the F number FN at a constant speed in an increase direction of the numeric value of the parameter.

The parameter changing section 160 acquires the gazing point R of the operator, and highlights an F number FN (F11) which matches the gazing point R of the operator present in the selection candidate region J, if the gazing point R of the operator is present in the selection candidate region J for a predetermined time or more.

The parameter changing section 160 acquires the gazing point R of the operator, and changes the F number FN (F11) highlighted in the selection candidate region J to (F16) and decides the changed value, if the gazing point R of the operator is present in the value decision region SC.

Figure 33B:
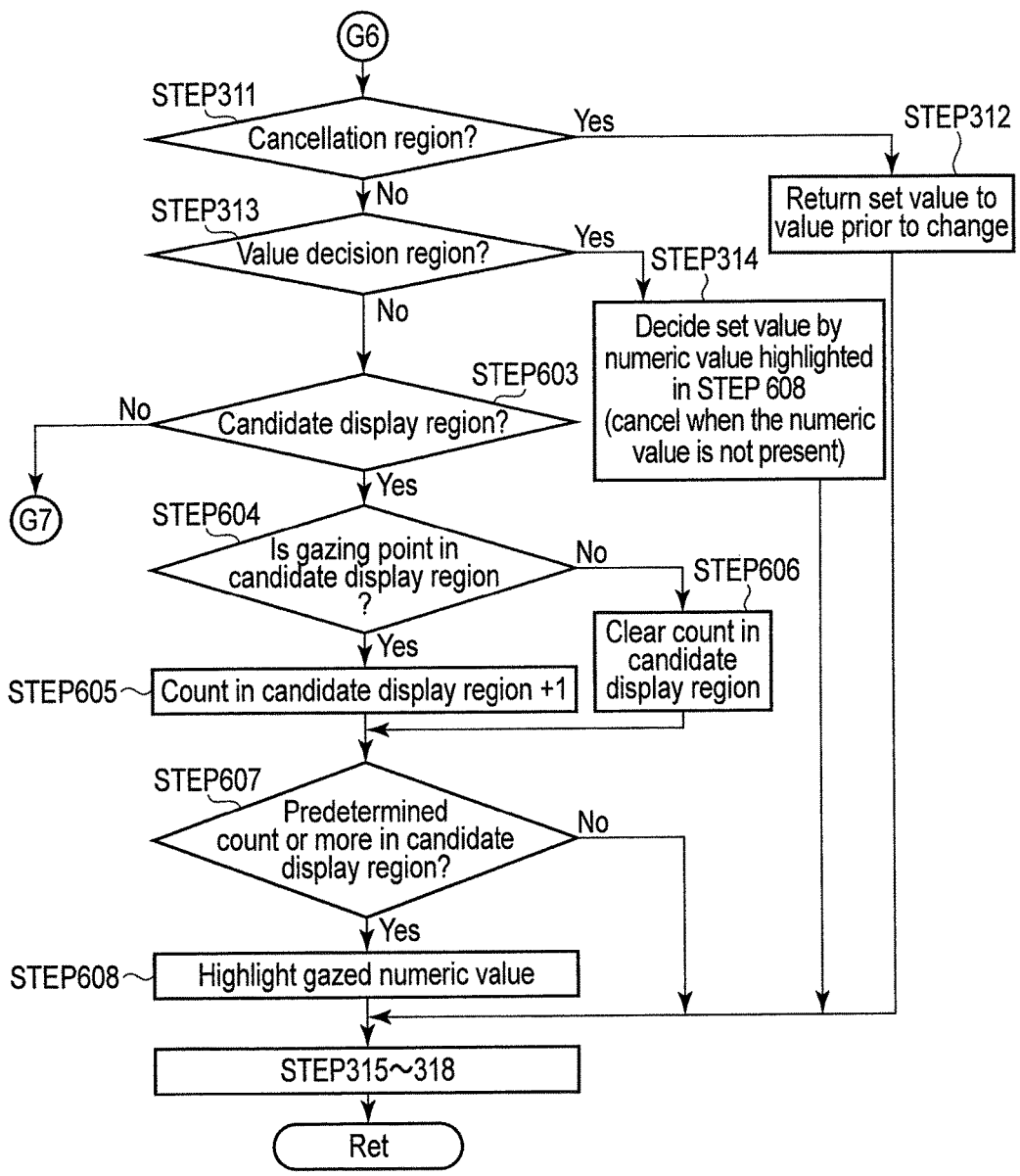
FIG. 33B is a numeric value changing flowchart in the camera.

For a specific operation of changing the parameter (STEP 10), steps different from those of the numeric value changing flowchart shown in FIG. 12A and FIG. 12B will be described with reference to a numeric value changing flowchart shown in FIG. 33A and FIG. 33B.

The parameter changing section 160 judges whether or not a numeric value change flag is set (STEP 301), moves, for example, the numeric value of the F number FN in a first display region H1a to the central portion of the change display region CD (STEP 302), acquires the gazing point R of the operator (STEP 303), and judges whether or not the gazing point R of the operator is present in a change start region Da including the numeric value of the F number FN moved to the central portion of the change display region CD as shown in FIG. 14 (STEP 304).

If the gazing point R of the operator is present in the change start region Da, the parameter changing section 160 displays the series of numeric values of the parameter, for example, part of numeric values of the F number FN (F: 2→2.8→4→5.6→8→11→2) arranged in the endless ring form on the display screen 140a of the liquid crystal monitor 140 for the rear surface as shown in, for example, FIG. 26 (STEP 305).

Similarly to the above, the parameter changing section 160 acquires the gazing point R of the operator on the display screen 140a of the liquid crystal monitor 140 for the rear surface on the basis of a visual line direction of the operator detected by a visual line detection sensor 141 for a rear surface liquid crystal (STEP 306).

The parameter changing section 160 judges whether or not the gazing point R of the operator is present in the increase region W as shown in, for example, FIG. 31 (STEP 307).

If the gazing point R of the operator is present in the increase region W, the parameter changing section 160 moves the parameter of the ring form, for example, the F number FN at a constant speed in the increase direction of the numeric value of the parameter as shown in FIG. 32 (STEP 601). For example, the parameter changing section 160 increases the numeric value of the F number FN in order of (F: 2→2.8→4→5.6→8→11).

If the gazing point R of the operator is present in the decrease region Q, the parameter changing section 160 moves the parameter of the ring form, for example, the F number FN at the constant speed in the decrease direction of the numeric value of the parameter as shown in FIG. 29 (STEP 602). For example, the parameter changing section 160 decreases the numeric value of the F number FN in order of (F: 11→8→5.6→4→2.8→2).

Similarly to the above, the parameter changing section 160 judges whether or not the gazing point R of the operator is present in the change cancellation region CC (STEP 311). As a result of the judgment, when the gazing point R of the operator is present in the change cancellation region CC, the parameter changing section 160 returns the numeric value of, for example, the F number FN as the parameter to a numeric value prior to the change (STEP 312).

If the gazing point R of the operator is not present in the change cancellation region CC, the parameter changing section 160 judges whether or not the gazing point R of the operator is present in the value decision region SC (STEP 313).

As a result of the judgment, when the gazing point R of the operator is not present in the value decision region SC, the parameter changing section 160 judges whether or not the gazing point R of the operator is present in the selection candidate region J (STEP 603). The selection candidate region J is interposed between the increase region W and the decrease region Q as described above, and, for example, the numeric values (F: 2.8, 4, 5.6) of the F number FN are present in the selection candidate region J as shown in, for example, FIG. 29.

As a result of the judgment, if the gazing point R of the operator is present in the selection candidate region J, the parameter changing section 160 then judges whether or not the gazing point R of the operator is present in the selection candidate region J (STEP 604), counts up a count in a candidate display region by "+1" when the gazing point is present in the selection candidate region J (STEP 605), and clears the count in the candidate display region if the gazing point is not present in the selection candidate region J (STEP 606).

The parameter changing section 160 judges whether or not a count value of the count in the candidate display region is a predetermined count value or more (STEP 607).

As a result of the judgment, if the count value of the count in the candidate display region is the predetermined count value or more, the parameter changing section 160 changes a display mode of the parameter of the gazing point R of the operator which is an F number FN (F4) herein, i.e., performs, for example, the highlighting as shown in FIG. 30 (STEP 608). In the change of the display mode, the numeric value of the F number FN (F4) is displayed in bold characters and a font size is enlarged. For the change of the display mode of the parameter, display color may be changed, or the display mode may be changed to blinking or the like similarly to the above.

Similarly to the above, the parameter changing section 160 passes through the STEP 315 to the STEP 318 to return to the STEP 313 in which it is judged again whether or not the gazing point R of the operator is present in the value decision region SC as shown in FIG. 30.

As a result of the judgment, if the gazing point R of the operator is present in the value decision region SC, the parameter changing section 160 decides the F number FN (F4) highlighted in the STEP 608 (STEP 314).

As described above, according to the fourth embodiment, the numeric values of a parameter such as the F number FN or the shutter speed SS are arranged in the endless manner, and the parameter such as the F number FN or the shutter speed SS is rotated and moved in the state where the ring-like arrangement is kept, to display a part of the parameter on the display screen 140a of the liquid crystal monitor 140 for the rear surface, so that an effect similar to that of the first embodiment can be produced.

Fifth Embodiment

A fifth embodiment of the present invention will be described with reference to the drawings. It is to be noted that in the present fifth embodiment, the same part as in the above first embodiment is denoted with the same reference symbols, detailed description thereof is omitted, and differences will be described.

In a program memory of a Bµcom 101, a parameter change program is stored. The parameter change program includes a changing function of displaying a coordinate axis in such a numeric value change region SW as shown in FIG. 34, and displaying a coordinate value of the coordinate axis, for example, a numeric value on an X-axis as a numeric value for the change of a parameter such as an F number FN or a shutter speed SS by a parameter changing section 160.

The numeric value change region SW is a region to change a parameter such as an F number FN (F5.6) or a shutter speed SS (200).

Therefore, if the parameter changing section 160 executes the parameter change program to display the coordinate axis in the numeric value change region SW, displays the coordinate value of the coordinate axis as the numeric value for the parameter change, and moves the parameter into the numeric value change region SW in conjunction with movement of a gazing point R of an operator, the coordinate value corresponding to the gazing point R is changed as the numeric value of the parameter.

The parameter changing section 160 judges whether or not the gazing point R of the operator is present in a first display region H1a or H1b for a predetermined time or more. As a result of the judgment, when the gazing point R of the operator is present in the first display region H1a or H1b for the predetermined time or more, the parameter changing section 160 displays the numeric value change region SW on a display screen 140a of the liquid crystal monitor 140 for a rear surface as shown in FIG. 34.

The parameter changing section 160 acquires the gazing point R of the operator, and displays a value decision region SC to decide the numeric value of the parameter above the numeric value change region SW, if the gazing point R of the operator is present on, for example, an F number FN (F5.6) and the F number FN (F5.6) enters into the numeric value change region SW in a dragged state as shown in FIG. 35. FIG. 35 does not show a change cancellation region CC.

For example, if the F number FN (F5.6) enters into the numeric value change region SW, the parameter changing section 160 displays the numeric values on the X-axis as numeric values (1.4, 5.6, 22, etc.) of the F number FN, and displays a numeric value of the F number FN corresponding onto the X-axis of the gazing point R of the operator, for example, (F5.0) in the numeric value change region SW as shown in FIG. 36.

In the display of the numeric value of the F number FN corresponding onto the X-axis of the gazing point R of the operator, the value of the X-axis coordinate is utilized. However, the present invention is not limited to this example, and an axis of the numeric value of the F number FN may separately be disposed. In the display of the numeric values of the F number FN, as shown in FIG. 26, the numeric values of a parameter such as the F number FN (F: 2→2.8→4→5.6→8→11→2) may be arranged in a ring form in accordance with an arrangement order, and a part of the F number FN may be displayed in the numeric value change region SW. A display mode of the numeric value of the F number FN corresponding onto the X-axis of the gazing point R of the operator may be changed to, for example, highlighting.

The parameter changing section 160 acquires the gazing point R of the operator. Furthermore, if the gazing point R of the operator moves in an X-axis direction in the numeric value change region SW, the numeric value is changeable to a numeric value of the F number FN corresponding to the moved gazing point on the X-axis coordinate.

[Parameter Gazing Judgment]

Figure 37:
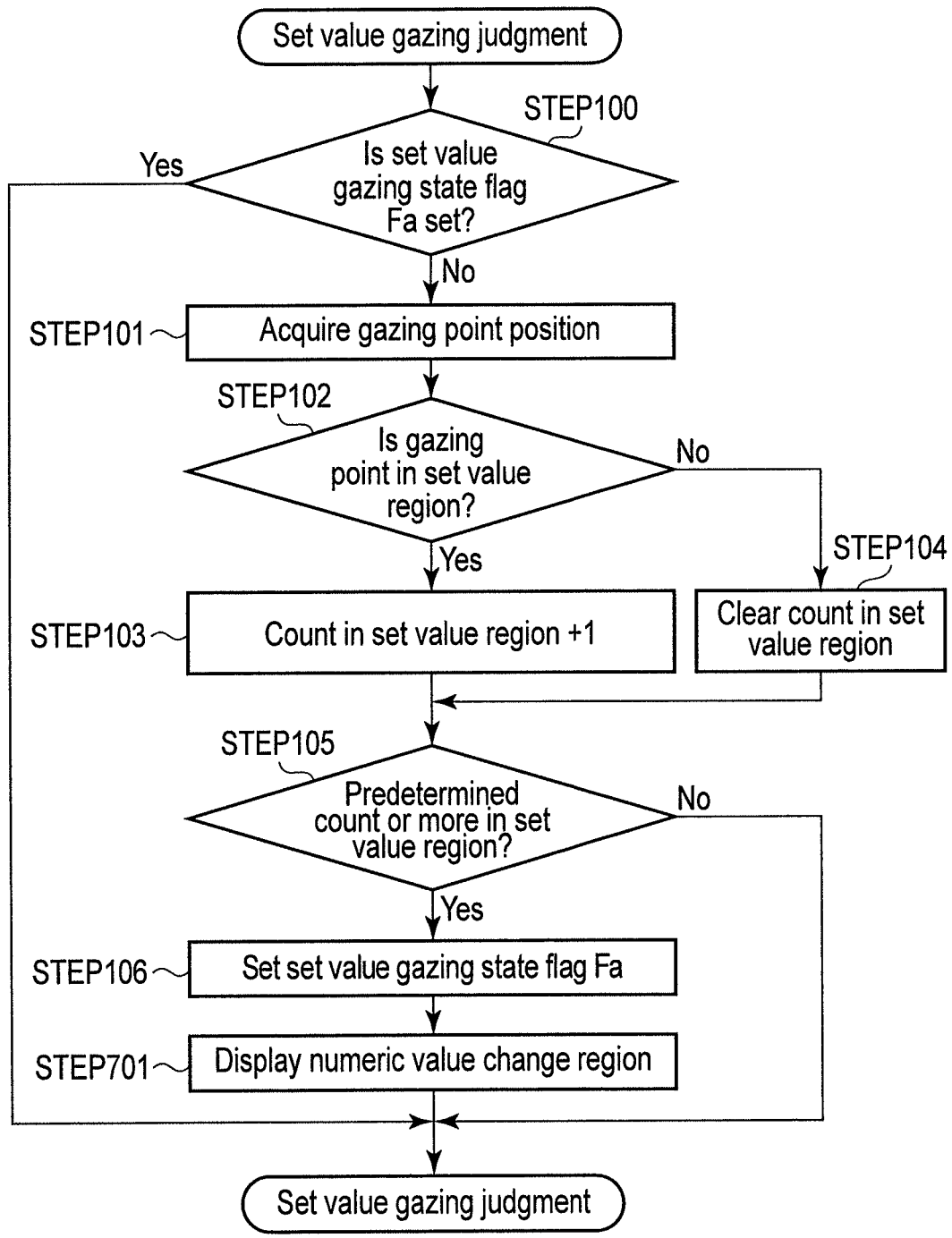
FIG. 37 is a parameter gazing judgment flowchart in the camera.

For a specific operation of judging the gazing point R of the operator (STEP 8), steps different from those of the flowchart shown in FIG. 10 will be described with reference to a parameter gazing judgment flowchart shown in FIG. 37.

The parameter changing section 160 judges whether or not a count value of a count in a set value region is a predetermined count value or more. That is, the parameter changing section 160 judges whether or not the gazing point R of the operator is present in the first display region H1a or H1b for the predetermined time or more (STEP 105).

As a result of the judgment, if the gazing point R of the operator is present in the first display region H1a or H1b for the predetermined time or more, the parameter changing section 160 sets a set value gazing state flag Fa (STEP 106).

The parameter changing section 160 judges whether or not the gazing point R of the operator is present in the first display region H1a or H1b for the predetermined time or more. As a result of the judgment, if the gazing point R of the operator is present in the first display region H1a or H1b for the predetermined time or more, the parameter changing section displays the numeric value change region SW on the display screen 140a of the liquid crystal monitor 140 for the rear surface as shown in FIG. 34 (STEP 701).

[Numeric Value Change]

Figure 38:
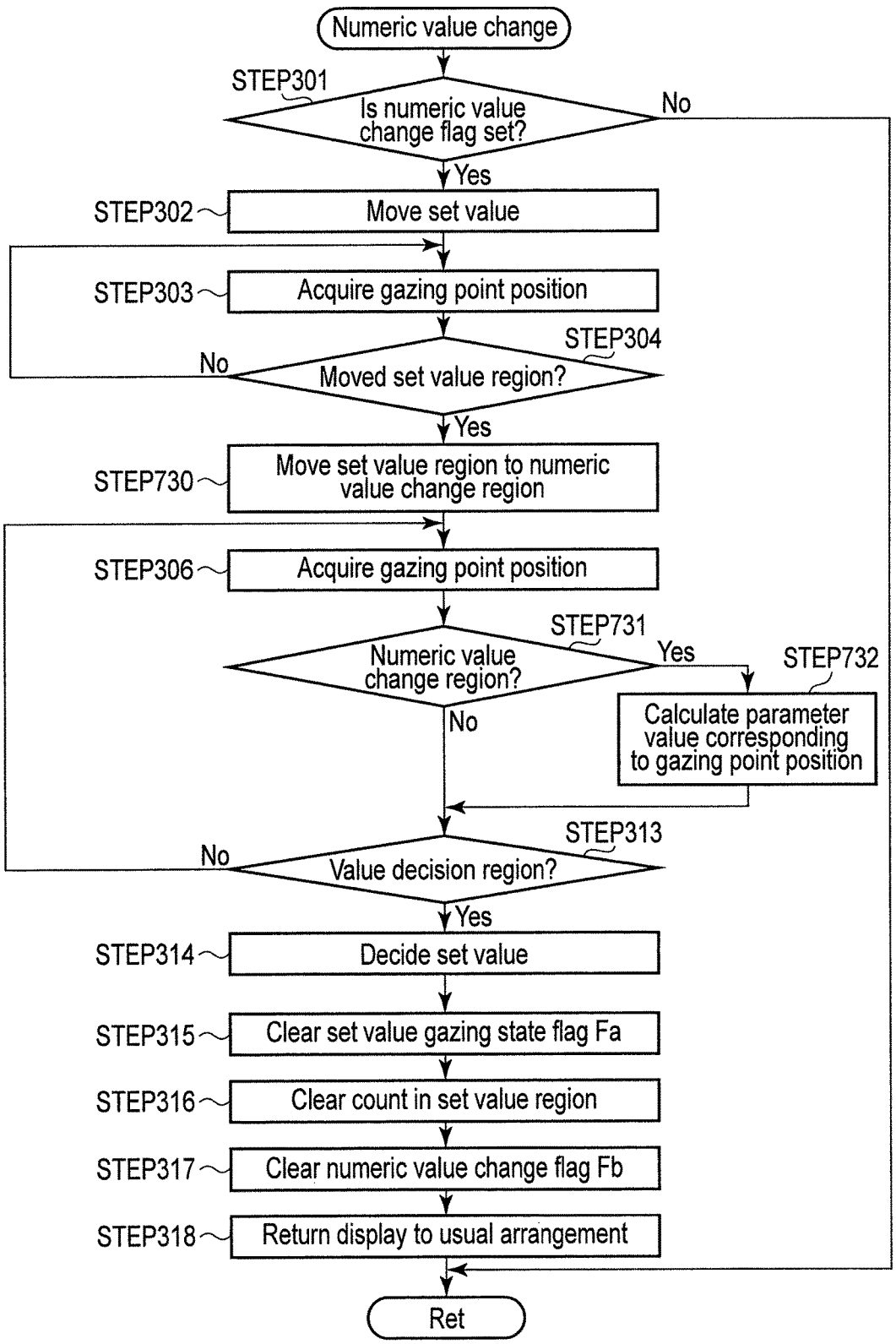
FIG. 38 is a numeric value changing flowchart in the camera.

For a specific operation of changing a parameter such as the F number FN or the shutter speed SS (STEP 10), steps different from those of the flowchart shown in FIG. 12A and FIG. 12B will be described with reference to a numeric value changing flowchart shown in FIG. 38.

Similarly to the above, the parameter changing section 160 acquires the gazing point R of the operator on the display screen 140a of the liquid crystal monitor 140 for the rear surface on the basis of a visual line direction of the operator detected by a visual line detection sensor 141 for a rear surface liquid crystal (STEP 303).

The parameter changing section 160 judges whether or not the acquired gazing point R of the operator is present in the numeric value change region SW, i.e., whether or not, for example, the F number FN (F5.6) moves in the dragged state in conjunction with the movement of the gazing point R of the operator and is present in the numeric value change region SW as shown in FIG. 35 (STEP 304).

As a result of the judgment, for example, if the F number FN (F5.6) moves into the numeric value change region SW, the parameter changing section 160 moves into the numeric value change region SW into which, for example, the F number FN (F5.6) is dragged, in conjunction with the movement of the gazing point R of the operator (STEP 730).

Similarly to the above, the parameter changing section 160 acquires the gazing point R of the operator again (STEP 306).

For example, if the F number FN (F5.6) moves into the numeric value change region SW in the dragged state, the parameter changing section 160 judges that, for example, the F number FN (F5.6) is present in the numeric value change region SW (STEP 731).

As shown in FIG. 36, the parameter changing section 160 displays the numeric values (1.4, 5.6, 22, etc.) of the F number FN on the X-axis and sets, for example, the numeric value of the F number FN to be changeable (STEP 732). That is, in the numeric value change region SW, as shown in FIG. 36, the parameter changing section 160 displays the numeric value on the X-axis corresponding to the gazing point R of the operator as the numeric value of the F number FN, for example, 5.0 in the numeric value change region SW.

The parameter changing section 160 acquires the gazing point R of the operator. Furthermore, if the gazing point R of the operator moves in the X-axis direction in the numeric value change region SW, the numeric value of the F number FN is changeable to a value corresponding to the moved gazing point on the X-axis coordinate.

Afterward, the parameter changing section 160 judges whether or not the gazing point R of the operator is present in the value decision region SC (STEP 313). As a result of the judgment, if the gazing point R of the operator is present in the value decision region SC, the parameter changing section 160 decides, for example, the numeric value of the F number FN as the changed parameter (STEP 314).

Hereafter, similarly to the above, the parameter changing section 160 executes STEP 315 to STEP 318.

As described above, according to the fifth embodiment, if the numeric value change region SW is displayed to change a parameter such as the F number FN (F5.6) or the shutter speed SS (200) and the parameter such as the F number FN (F5.6) is dragged and moved into the numeric value change region SW, the numeric value on the X-axis is displayed as the numeric value of the F number FN in the numeric value change region SW, and the gazing point R of the operator is moved in the X-axis direction in the numeric value change region SW, to change the numeric value of the F number FN. Therefore, an effect similar to that of the first embodiment can be produced.

According to the fifth embodiment, a space between the display position of a parameter such as the F number FN (F5.6) or the shutter speed SS (200) and the numeric value change region SW shortens, and hence a distance to drag the parameter such as the F number FN (F5.6) in conjunction with the movement of the gazing point R of the operator can be shortened. An operation of dragging the parameter such as the F number FN (F5.6) to be changed and set can simply and easily be performed without any mistakes.

For the numeric value change region SW, the parameter such as the F number FN (F5.6) is changed in the region SW, and hence the gazing point R of the operator can be moved less.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
a display which includes a display screen and in which a first display region and a second display region are displayed in the display screen, the first display region displaying at least one changeable parameter;
a visual line detection sensor which detects a visual line direction of an operator; and
a microcomputer executing instructions, stored on a memory, to:
acquire a visual point position on the display screen corresponding to the visual line direction detected by the visual line detection sensor, judge movement of the visual point position on the display, and drag the at least one changeable parameter on the display in accordance with movement of the visual point position on the display;
hold a state where the visual point position is in the first display region, when it is judged that the visual point position has entered into the first display region; and
change the display of at least one of the first display region and the second display region, when it is judged that the visual point position has dragged the at least one changeable parameter from the first display region into the second display region; wherein
the display further displays a change cancellation region, and when it is judged that the visual point position has dragged the at least one changeable parameter into the change cancellation region, the display of the first display region or the second display region is changed so as to cancel a change of the display, and
when it is judged that the visual point position has dragged the at least one changeable parameter into the second display region, the display further displays a change display region to change the at least one changeable parameter.

2. The imaging device according to claim 1,
wherein when it is judged that the visual point position is present in the second display region for a predetermined time or more, the display of at least one of the first display region and the second display region is changed.

3. The imaging device according to claim 1,
wherein when it is judged that the visual point position is present in the first display region for a predetermined time or more, a display mode of the first display region is changed.

4. The imaging device according to claim 1,
wherein when it is judged that the visual point position has entered into the second display region, a third display region is displayed to bring the first display region to a changeable state in the display screen.

5. The imaging device according to claim 1,
wherein the display of the first display region is changed in accordance with the display of the second display region.

6. The imaging device according to claim 5,
wherein the at least one changeable parameter is one or plural setting items displayed in the first display region, and candidates to change a setting item are displayed in a third display region.

7. The imaging device according to claim 6,
wherein the microcomputer further executes instruction to display a list of a series of setting items in the third display region, move and display the setting items displayed in the list in conjunction with movement of the visual point position, and select a setting item from the plural setting items on the basis of the movement of the visual point position.

8. The imaging device according to claim 6,
wherein a coordinate axis provided with a coordinate value is displayed in the third display region, and a setting item from the coordinate value is selected on the basis of the movement of the visual point position.

9. The imaging device according to claim 1,
wherein the display of the second display region is changed in accordance with the display of the first display region.

10. The imaging device according to claim 1, wherein the change display region comprises:
a parameter decrease region having sub-regions corresponding to a large change amount, a medium change amount, and a small change amount,
a parameter increase region having sub-regions corresponding to a large change amount, a medium change amount, and a small change amount, and
when it is judged that the visual point position has dragged the at least one changeable parameter into the parameter increase region or the parameter decrease region, the at least one changeable parameter is changed in an amount corresponding to an entered sub-region.

11. A display method for an imaging device comprising:
displaying a first display region and a second display region in a display section including a display screen, the first display region displaying at least one changeable parameter;
detecting a visual line direction of an operator;
acquiring a visual point position on the display screen corresponding to the visual line direction;
judging whether or not the visual point position has moved on the display screen and dragged the at least one changeable parameter on the display screen in accordance with movement of the visual point position on the display screen;
holding a state where the visual point position is in the first display region, when it is judged that the visual point position has entered into the first display region;
changing the display of at least one of the first display region and the second display region, when it is judged that the visual point position has dragged the at least one changeable parameter from the first display region into the second display region;
displaying a change cancellation region in the display section, wherein when it is judged that the visual point position has dragged the at least one changeable parameter into the change cancellation region, changing the display of the first display region or the second display region so as to cancel a change of the display, and displaying a change display region in the display section when it is judged that the visual point position has dragged the at least one changeable parameter into the second display region, the change display region comprising at least one parameter change region to change the at least one changeable parameter.

12. The display method according to claim 11, wherein the changing of the display comprises changing the display of at least one of the first display region and the second display region, when it is judged that the visual point position is present in the second display region for a predetermined time or more.

13. The display method according to claim 11, wherein the changing of the display comprises changing a display mode of the first display region, when it is judged that the visual point position is present in the first display region for a predetermined time or more.

14. The display method according to claim 11, wherein the changing of the display comprises displaying a third display region to bring the first display region to a changeable state in the display screen, when it is judged that the visual point position has dragged the at least one changeable parameter into the second display region.

15. The display method according to claim 11, wherein the changing of the display comprises changing the display of the first display region in accordance with the display of the second display region.

16. The display method according to claim 11, wherein the changing of the display comprises changing the display of the second display region in accordance with the display of the first display region.

17. The display method according to claim 11, wherein the at least one parameter change region comprises:
a parameter decrease region having sub-regions corresponding to a large change amount, a medium change amount, and a small change amount,
a parameter increase region having sub-regions corresponding to a large change amount, a medium change amount, and a small change amount, and
wherein when it is judged that the visual point position has dragged the at least one changeable parameter into the parameter increase region or the parameter decrease region, a parameter is changed in an amount corresponding to an entered sub-region.

18. A non-transitory computer readable storage medium storing a display program associated with an imaging device, the program comprising:
a display function of displaying a first display region and a second display region in a display screen of a display section, the first display region displaying at least one changeable parameter;
a visual line detecting function of detecting a visual line direction of an operator;
a visual line judging function of acquiring a visual point position on the display screen corresponding to the visual line direction detected by the visual line detecting function and judging whether or not the visual point position has moved on the display screen and dragged the at least one changeable parameter on the display screen in accordance with movement of the visual point position on the display screen;
a display control function of holding a state where the visual point position is in the first display region, when it is judged by the visual line judging function that the visual point position has entered into the first display region; and a display changing function of changing the display of at least one of the first display region and the second display region, when it is judged by the visual line judging function that the visual point position has dragged the at least one changeable parameter from the first display region into the second display, wherein
the display function further displays a change cancellation region, and when the visual line judging function judges that the visual point position has dragged the at least one changeable parameter into the change cancellation region, the display changing function changes the display of the first display region or the second display region so as to cancel a change of the display; and
the display function further displays a change display region in the display section when it is judged by the visual line judging function that the visual point position has dragged the at least one changeable parameter into the second display region, the change display region comprising:
a parameter decrease region having sub-regions corresponding to a large change amount, a medium change amount, and a small change amount,
a parameter increase region having sub-regions corresponding to a large change amount, a medium change amount, and a small change amount, and
when the visual line judging function judges that the visual point position has dragged the at least one changeable parameter the parameter increase region or the parameter decrease region, a parameter is changed in an amount corresponding to an entered sub-region.

19. The computer readable storage medium storing the display program according to claim 18, wherein when it is judged by the visual line judging function that the visual point position is present in the second display region for a predetermined time or more, the display changing function changes the display of at least one of the first display region and the second display region.

20. The computer readable storage medium storing the display program according to claim 18, wherein when it is judged by the visual line judging function that the visual point position is present in the first display region for a predetermined time or more, the display changing function changes a display mode of the first display region.

21. The computer readable storage medium storing the display program according to claim 18, wherein when it is judged by the visual line judging function that the visual point position has dragged the at least one changeable parameter into the second display region, the display changing function displays a third display region to bring the first display region to a changeable state in the display screen.

22. The computer readable storage medium storing the display program according to claim 18, wherein the display changing function changes the display of the first display region in accordance with the display of the second display region.

23. A display device associated with an imaging device comprising:
a display which includes a display screen and in which a first display region and a second display region are displayed in the display screen, the first display region displaying at least one changeable parameter;
a visual line detection sensor which detects a visual line direction of an operator; and a microcomputer executing instructions, stored on a memory, to:
- acquire a visual point position on the display screen corresponding to the visual line direction detected by the visual line detection sensor, judge movement of the visual point position on the display, and drag the at least one changeable parameter on the display in accordance with movement of the visual point position on the display;
- hold a state where the visual point position is in the first display region, when it is judged that the visual point position has entered into the first display region; and
- change the display of at least one of the first display region and the second display region, when it is judged that the visual point position has dragged the at least one changeable parameter from the first display region into the second display region; wherein the display further displays a change display region comprising a parameter decrease region and a parameter increase region when it is judged that the visual point position has dragged the at least one changeable parameter into the second display region, and a parameter value is decreased when it is judged that the visual point position has dragged the at least one changeable parameter into the parameter decrease region, and the parameter value is increased when it is judged that the visual point position has dragged the at least one changeable parameter into the parameter increase region.

* * * * *